US008838278B2

(12) United States Patent  (10) Patent No.: US 8,838,278 B2
Petit et al.  (45) Date of Patent: Sep. 16, 2014

(54) METHOD AND DEVICE FOR PRODUCING A MIXTURE OF CONSTITUENTS WITH CONSTRAINTS, ESPECIALLY WITH PREMIXING

(75) Inventors: Nicolas Petit, Sceaux (FR); Yann Creff, Les Cotes D'Arey (FR); Mériam Chebre, Septeme (FR)

(73) Assignee: Total Raffinage Marketing, Puteaux (FR)

( * ) Notice: Subject to any disclaimer, the term of this patent is extended or adjusted under 35 U.S.C. 154(b) by 679 days.

(21) Appl. No.: 13/057,245

(22) PCT Filed: Jul. 20, 2009

(86) PCT No.: PCT/FR2009/051443
§ 371 (c)(1),
(2), (4) Date: Mar. 17, 2011

(87) PCT Pub. No.: WO2010/015766
PCT Pub. Date: Feb. 11, 2010

(65) Prior Publication Data
US 2011/0160921 A1  Jun. 30, 2011

(30) Foreign Application Priority Data
Aug. 4, 2008  (FR) ...................................... 08 04422

(51) Int. Cl.
*G05D 11/02* (2006.01)
*G05D 11/13* (2006.01)
(52) U.S. Cl.
CPC .................................... *G05D 11/139* (2013.01)
USPC ....................................................... 700/285

(58) Field of Classification Search
USPC .......................................................... 700/285
See application file for complete search history.

(56) References Cited

U.S. PATENT DOCUMENTS

| 4,395,290 | A | 7/1983 | Oller et al. |
|---|---|---|---|
| 6,120,173 | A | 9/2000 | Bonissone et al. |
| 6,159,255 | A | 12/2000 | Perkins |
| 2004/0221889 | A1 | 11/2004 | Dreyer et al. |
| 2009/0187279 | A1 | 7/2009 | Bernier et al. |

FOREIGN PATENT DOCUMENTS

| CA | 2221032 A1 | 1/1997 |
|---|---|---|
| FR | 2 901 894 A1 | 12/2007 |
| WO | 97/01183 A1 | 1/1997 |

*Primary Examiner* — Carlos Ortiz Rodriguez
(74) *Attorney, Agent, or Firm* — Sughrue Mion, PLLC

(57) ABSTRACT

The invention relates to a method and a system for controlling the production of a mixture of constituents, especially a mixture with premix dead volumes.
By correcting the matrices for calculating the mixture constituents, used in calculating recipes, by introducing limit, order relationship and equality constraints, it is possible to avoid the drifts observed in certain special cases by the implementation of the method and to improve, on the one hand, the diagnostic assistance and the control of the estimation of the properties so as to limit the deviations from the actual quality of the constituents of the mixture and, on the other hand, the speed of manufacture of the mixture and the robustness of the method.
The method and the system according to the invention ensure multivariable regulation feedback by a dynamic observer providing an estimate in real time of the properties of the constituents of the mixture, said estimate being sufficient to guarantee the effectiveness of the feedback loop.

22 Claims, 10 Drawing Sheets

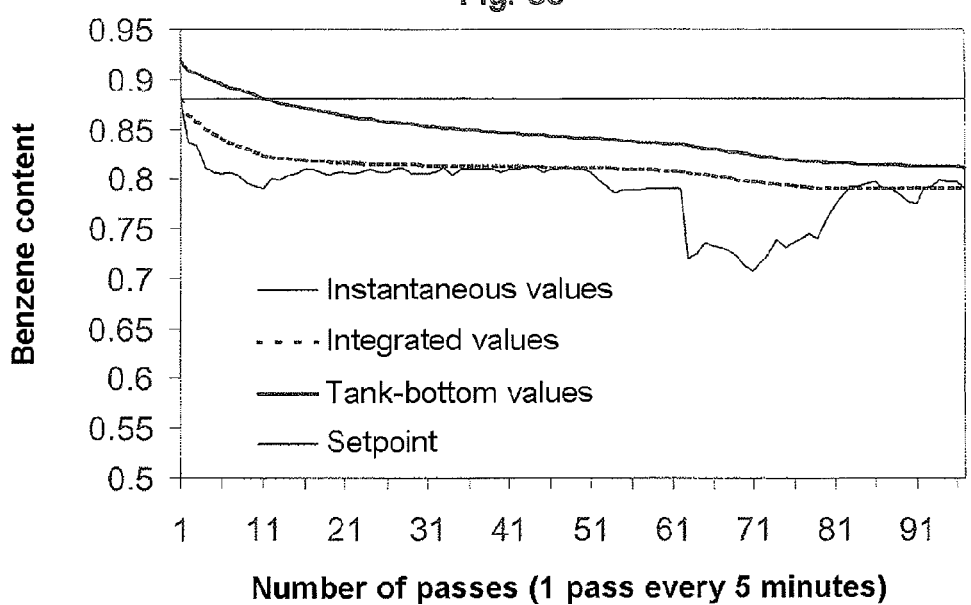

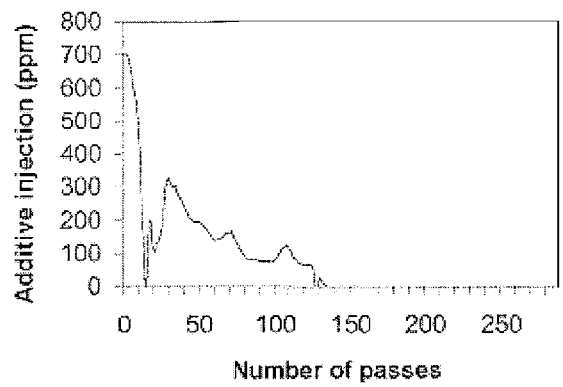
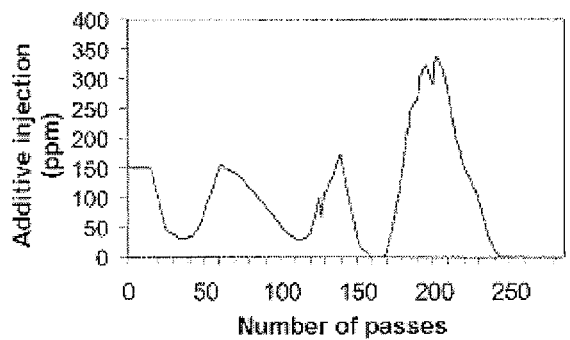
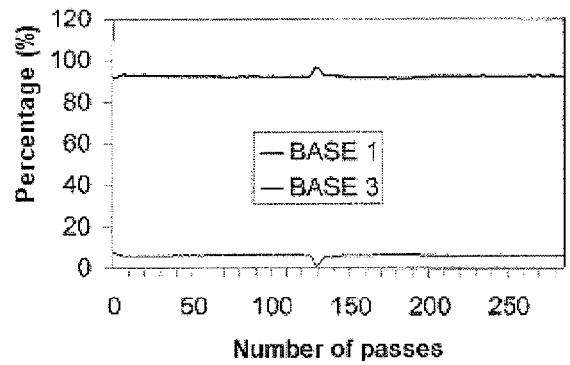

METHOD AND DEVICE FOR PRODUCING A MIXTURE OF CONSTITUENTS WITH CONSTRAINTS, ESPECIALLY WITH PREMIXING

BACKGROUND OF THE INVENTION

The invention relates to a method and a system for controlling the production of a mixture of constituents, especially a mixture with premix dead volumes.

It applies more particularly to automatically regulating mixtures of constituents in line, such as for example mixtures of oil products, in which the mixtures produced comply with a set of specifications or significant parameters. In these applications, each product contained in the mixture acts on the set of characteristics or parameters of the final mixture obtained.

The invention applies in particular to the production of mixtures in which the characteristics or parameters of the various constituents are not well known or may change during production of the mixture. Mixtures of oil products in particular have these aspects, but the method and the system of the invention may apply to mixtures of other products, for example such as cements, paints, etc.

In all cases, the aim is to obtain a mixture having a state defined in advance or constitutional parameters that are defined in advance. These parameters relate to the physico-chemical characteristics of the mixtures to be obtained. In the case of a mixture of oil products for example, these parameters may be the sulphur content of the mixture, its octane number, etc. For a mixture of cements, the parameters will for example be the lime content, the silica ratio, the alumino-ferric ratio, etc.

DESCRIPTION OF THE PRIOR ART

Known methods and systems in the prior art make it possible to produce a mixture in line or in closed-loop mode, that is to say with feedback on the basis of information measured in real time, continuously or periodically, using measurement instruments (in-line analysers) placed downstream of the mixing plant (mixer). These methods and systems generally apply to flows of constituents coming from tanks of intermediate products.

A typical feedback procedure uses the deviation between a target setpoint and the measurement. This is an output return feedback procedure.

Another typical feedback procedure consists in correcting the predictions of the characteristics or parameters of the mixture, by adding to them a term that is the result of a first-order filtering of the difference between the measurement and the prediction without correction.

These typical feedback procedures have the drawback of being applied on the mixture output by the mixer and not on the characteristics of the constituents upstream of the mixer.

The regulations used generally take into account the constraints on the quality of the mixture to be manufactured, and also the constraints associated with the constituent feed channels (for example limits associated with the hydraulic constraints, such as the size of the pumps, homogeneity constraints on the calculated proportions, the sum of which must be equal to 1 over all the channels). They also allow the total mixture production output to be controlled.

The known systems and methods have the drawback of meeting the various specifications of the mixture as a function of integrated (volume-averaged or cumulative) properties of the mixture in a holding tank for the mixture located immediately downstream of the mixer. This is because the properties of the mixture are generally measured on the instantaneous mixture at the mixer outlet, upstream of the holding tank for the mixture, these measurements making it possible to obtain an estimate of the integrated quality (flow exiting the mixer or entering the tank) which is the objective of the regulation in mixture-integrated mode or tank-integrated mode (the definition of these modes will be given later).

Although these methods and systems operating integratedly are well suited for conventional mixing areas, with tanks of constituents, possibly with flow-off, that is to say fed in as they are consumed, and a holding tank for the mixture, they are not sufficient for operation with direct continuous upstream flow of the constituents and, optionally, continuous direct delivery of the mixture produced, without passing via a holding tank.

This is because said methods and systems are dependent on the qualities of the constituents, which may vary, especially during a continuous upstream flow of the constituents.

Moreover, in a configuration with direct continuous downstream flow of the mixture, the proportions of the constituents of the mixture obtained by the known systems are corrected by taking into account the volume of mixture present in the holding tank. Thus, during production of a given volume of mixture in the holding tank, the properties of the mixture are liable to vary greatly, which would not be acceptable in the case of direct continuous delivery of the mixture.

Another drawback of the known systems and methods is that they cannot easily manage unfeasible situations by an optimum compromise solution. That is to say, when one or more constraints cannot be met, the solution obtained results in a mixture in which the deviation from the required specifications cannot be correctly controlled.

The conventional feedback methods are also insufficient for managing the synchronization of the plants for premixing the constituents upstream, in particular in the case of multiple premixing operations in series and/or in parallel. This is because such premixing operations generate a delay in the flows of certain constituents that require the use of large manufacturing margins so as to meet the specifications of the mixture in the holding tank, but which result in unnecessary and expensive overquality. Furthermore, this lack of synchronization may result in surging (oscillations), leading to improper stressing of the control members, possibly resulting in their premature wear.

Finally, the known methods and systems generally regulate, independently, on the one hand the proportion of the constituents and on the other hand the injection of additives in order to adjust the specifications of the mixture in a decoupled manner. This regulation independence precludes any economizing on expensive injections of additives.

The known methods and systems also control the total output of the mixer, taking into account the high and low limit constraints associated with hydraulic limitations (size of the pumps in the chosen channels upstream and downstream of the mixer) and also associated with economic limitations (scheduling constraints), and in particular maximize the output so as to shorten the manufacturing times, while automatically reducing the rate in the case of an active constraint on the applicability of the calculated recipe.

SUMMARY OF THE INVENTION

The objective of the present invention is to provide a method of controlling the production of a mixture, and a corresponding system, remedying these drawbacks.

In particular, the control method according to the invention provides a multivariable regulation feedback procedure by a dynamic observer for estimating, in real time, the properties of the constituents of the mixture, sufficient to guarantee the effectiveness of the feedback loop. Thus, the desired properties of the mixture are guaranteed despite large uncertainties in the properties of the constituents on the one hand, and partial knowledge of the mixing process on the other.

In a previous application, FR 2901894, the Applicant developed a method for controlling the production of a mixture M of n constituents, this method making it possible to determine the proportions u of the constituents involved in the mixture so as to obtain a number m of predetermined properties y of the mixture, the values of which lie between predetermined minimum and maximum thresholds and/or, for m' of them (where m'≤n−1), are substantially equal to predetermined target values, said method comprising the following steps:

(i) at time t=0:
(1) a matrix B representing a number m of properties y of the n constituents is determined,
(2) a reference recipe $\bar{u}$ is determined from the predetermined minimum and maximum thresholds and/or from the predetermined target values, such that the properties $B\bar{u}$ of the mixture lie between said predetermined thresholds and/or, for m' of them, are equal to said predetermined target values, $\bar{u}$, being a vector of dimension n, representing the proportions of the various constituents involved in the composition of the mixture, where $\Sigma_{i=1}^{n}\bar{u}_i = 1$,
(3) the recipe if is applied to the constituents so as to produce a mixture M;

(ii) at time t'=t+Δt:
(1) the properties $y_{mes}$ of the mixture M obtained by applying the recipe calculated at the previous time are measured,
(2) a corrected matrix $\hat{B}$, representing the estimate of the properties of the constituents, is deduced therefrom,
(3) a new recipe u is determined in such a way that the properties $\hat{B}u$ of the mixture lie between said predetermined thresholds and/or, for m' of them, are equal to said predetermined target values,
(4) this new recipe u is applied to the constituents;

(iii) at time t''=t'+Δt, operations (1) to (4) of the preceding step (ii) are repeated; and (iv) step (iii) is repeated throughout the duration of production of the mixture.

Thus, at the start time t=0, a matrix $B_0$ is determined, for example on the basis of the data supplied by the manufacturers of the constituents, or from laboratory measurements, followed by progressive updating as the mixture is being produced.

It should be noted that the predetermined minimum and maximum thresholds, and also the predetermined target values, may be modified during the mixing operation.

This method had the advantage of updating the estimate of the properties of the constituents, thereby making it possible to take into account the variations in their properties over the course of time so as to maintain the desired specifications of the mixture. This novel approach makes it possible to factor out inaccuracies and uncertainties in the properties of the constituents due to measurement errors, to defects/contaminations, to incomplete homogenization or to stratification of the tanks, or to variability over time of the various constituents. This method may thus be advantageously used in plants with a direct upstream continuous flow of the constituents.

However, the estimator as claimed in this method has some notable drawbacks such as, for example, the need to estimate properties of the constituents that are sometimes far from reality. In particular in certain particular cases characterized by poor knowledge of the mixture constituents, it is observed that the convergence process slows down, or even that no convergence at all is observed, thereby resulting in estimated characteristics outside the physical range, which are zero or even negative (which may result in control variations in the opposite direction to that expected) which never corresponds to the reality. Such phenomena are often sporadic and temporary, but have the consequence that mixtures are manufactured having a poor quality or taking longer time than necessary, and therefore they have to be remanufactured in the refinery in order to make up new mixtures, the characteristics of which are compatible with the specifications of the expected product. This is costly in terms of time and of availability of units for remaking these mixtures.

The object of the present invention is to improve this method, by improving, on the one hand, the diagnostic aid and the control of the estimate of the properties, so as to limit the deviations from the real quality of the constituents of the mixture, and, on the other hand, by improving the speed of manufacture of the mixture and the robustness of the method.

Firstly, the method according to the invention makes it possible not only to provide a feedback loop with guarantee of convergence between the prediction and the measurement, in the quality space of the emerging mixture, that is the space defined by the required specification fields of the mixture output, thus ensuring success of the actual mixtures.

Secondly, the method according to the invention makes it possible to increase the robustness with respect to observed drifts in the case of residual uncertainty in the constituents (variable property, poor homogenization of the tank, etc.). This results in better convergence in certain difficult mixing cases, or more rapid convergence, and therefore a shorter mixture production time and greater availability of equipment for producing more products. It is thus possible to increase the manufactured volumes or improve the manufacturing flexibility of the mixtures.

For this purpose, the Applicant has introduced into step (ii) a correction to the matrix $\hat{B}$ by at least one correction operation introducing at least one constraint corresponding to limit, order relation and/or equality constraints.

These new constraints, which might not be defined during the calculation of the reference recipe, are independent and separate from predetermined minimum and maximum thresholds and predetermined target values defined at the start for the objectives of the mixture to be manufactured. For example, the limits may be chosen either on the basis of the latest laboratory analyses available on the bases and constituents or on the basis of scales known a priori, input manually or configured for a given mixer. The order relationships may be defined conditionally in conjunction with exogenic elements (of the type with or without the objective of base incorporation tendency). These constraints may or may not be defined and therefore added, property by property, to a given mixture (since the assigning of the constraints may be flexible and contextual on the mixture in question, it will not generally be fixed in terms of the setting configuration of the mixer in question). Thus, it is possible to define constraints on the sulphur content by specifying minimum and maximum sulphur contents or limits for all the bases or else order relations or equalities between bases depending on their sulphur content; this makes it possible to fix a preferred order for using a base relative to one or more other bases in order to arrive at the mixture for which the specification must necessarily be met.

These limit, equality and/or order relation constraints are imposed systematically on all the bases over the course of time for certain measurements or for the equivalent or preferred choice of one or more bases for the mixture to be manufactured.

By introducing these new constraints, the estimated properties may be used as indication of the variation in quality of the constituents (independently of the calculation of the recipe which is associated therewith in order to control the mixing). The estimated properties of the constituents may be used as diagnostic information independent of the control of the mixer, and make it possible to improve the knowledge of the constituents used (detection of a constituent of suspect quality, etc.).

Advantageously, the properties $y_{mes}$ of the mixture that are measured during operation (1) of step (ii) are measured by means of a continuous measurement procedure on the mixture produced. The term "continuous measurement procedure" is understood to mean either a measurement carried out continuously when its nature so allows, or a succession of samples being removed and measurements made on these samples.

These instantaneous measurements on the mixture, right from its formation, make it possible to use the method for a plant in which the mixture is directly delivered in a continuous fashion. The method is then in instantaneous mode.

The method according to the invention has the advantage of being able to operate in integrated mode, the measurements then being able to be accumulated or volume-averaged in a tank for holding the mixture. It is also possible to switch from integrated mode to instantaneous mode (or conversely) during production of the mixture.

For example, this switching may be carried out manually by an operator so as to modify the required regulation mode during mixing.

The switching may also be carried out automatically, in sequence, for example at the end of mixing, when a flowed volume has been reached, and by taking into account the remaining volume to be manufactured. This configuration is used in particular for guaranteeing direct delivery by an oil pipeline, or else to guarantee the quality of the entire residual product in the lines, in the case of large line volumes between a mixer and a tank for storing the end product located in a remote storage area.

Advantageously, at a predetermined time during the production of the mixture, one or more properties of the constituents are measured and the matrix $\hat{B}$ representing the properties of the constituents is updated. It is thus possible, without having to reset the method, to update by measuring one or more properties of a constituent. This makes it possible to improve the estimate of the property or properties of this constituent. The rate of updating may be adjustable, property by property, for each constituent.

According to the present invention, the matrix $\hat{B}$ can be corrected by at least one correction operation for introducing at least one constraint corresponding to limit, order relationship and/or equality constraints on at least one of the properties. This correction operation consists in modifying the initial value of $\hat{B}$ which is $B_0$, corresponding to the following equation (1)

$$\frac{d\hat{B}_j^t}{dt} = -\beta_j H u (y_j - y_j^{mes}) \quad (1)$$

in which $\beta_j$, a strictly positive real number, is a constant for setting the convergence time, allowing the rate of convergence of the estimate to be differentiated property by property.

the matrix H is a positive definite symmetric matrix having the purpose of ensuring normalization in taking into account the measurement-prediction deviation, allowing constituent quality prediction deviation calculation, so as to provide the method convergence properties; and $\hat{B}_j^t$ is the transpose of $\hat{B}_j$, where j is the mixture property index, the modification of $\hat{B}$ being obtained by substituting equation (1) with an equation corresponding to a new adaptation law and/or by the addition of an additional term $\delta$.

In other words, to correct the matrix $\hat{B}$, the initial value of $\hat{B}$, i.e. $B_0$, is modified by replacing equation (1) with a new differential equation corresponding to a new adaptation law in order to integrate the asymptotic compliance of the intended constraints and/or by carrying out an operation of adding, to the value of the estimate $\hat{B}$, having an initial value $B_0$, estimated and possibly modified by the previous adaptation law, of an additive term $\delta$ resulting from an optimum calculation for strictly complying with the intended constraints.

The term "adaptation law" is understood to mean the differential equation (1) governing the estimation of the properties of the constituents. The new adaptation law according to the invention then consists of a new differential equation replacing differential equation (1), or a modification of the second term of differential equation (1).

According to a first embodiment, the modification of the matrix $\hat{B}$ corresponding to the substitution of equation (1) with an equation corresponding to a new adaptation law may comprise the addition of an additional function to equation (1) or its substitution with another independent equation.

According to a first variant, the matrix $\hat{B}$ is modified by replacing the initial equation (1) with an equation comprising the addition of an additional function to equation (1), namely;

$$\frac{d\hat{B}_j^t}{dt} = \beta_j H u (y_j - y_j^{mes}) + \lambda f(\hat{B}_j^t) \quad (1.1)$$

in which f is a non-zero function, chosen according to a profile enabling at least one constraint corresponding to limit, order relationship and/or equality constraints to be introduced;

$\lambda$ is a weighting coefficient, enabling the speed of return of the estimated properties of the constituents to be adjusted in an admissible range defined by limits; and H is a diagonal matrix so as to provide the convergence properties of the method.

Various choices of the matrix H, which will remain symmetric and positive definite, are possible for ensuring that such a system converges.

For example, it is possible to use the following matrix H, which introduces a normalization factor based on the initial reference recipe:

$$\frac{1}{\|\overline{u}\|} \begin{pmatrix} \frac{1}{u_1} & & & \\ & \ddots & & \\ & & & \frac{1}{u_n} \end{pmatrix}$$

The normalization performed by the matrix H is particularly important for factoring out physical scale effects from one property to another, and different variation sensitivities specific to each property.

This normalization then allows the calculated prediction deviations (after scale effects have been factored out) to be better modulated, it being possible for this modulation to be performed, for example, proportionally to a term associated with the current recipe, with respect to a reference recipe.

The constant $\beta_j$ is used to differentiate the rate of convergence of the estimate, property by property, and in particular makes it possible to take into account the specific features of the measurement delay specific to each property.

As examples of $\beta_j$ settings, values equal to two to four times the pure delay may be taken.

For example, for a property such as the octane number associated with a measurement delay of 10 minutes, $\beta$ will be set to 20 minutes.

For a property such as the percentage distilled at 70° C. associated with a measurement delay of 40 minutes (in-line chromatography), $\beta$ may be set to 80 minutes.

The function f will be suitably chosen so as to keep the convergence properties of the method unchanged, while introducing constraints (limit, order relationship and/or inequality constraints) to be respected on the resulting estimates. The function thus ensures asymptotic convergence, guaranteeing compliance with the constraints at the end of convergence.

The non-zero function f may be chosen according to a profile for directing the convergence of the estimated properties of the constituents towards a set of values satisfying at least one constraint corresponding to limit, order relationship and/or equality constraints.

This function f may be chosen according to a piecewise linear or logarithmic profile or else using matrix calculations.

To give an example, the following functions may be implemented.

For limit constraints, this function f may thus take the following form:

Consider a non-empty interior interval $[B_{min}, B_{max}]$ containing $B(i)$, $\forall i$, $f(y)=0$ if $y \in [B_{min}, B_{max}]$ $f(y) \leq 0$ if $y \geq B_{max}$ $f(y) \geq 0$ if $y \leq B_{min}$.

For order relationship constraints, this function f may thus take the following form:

Let m be the number of bases subjected to the order relationship:

$B_j(1) \leq \ldots \leq B_j(m)$.

The adaptation law may take the following form:

$$\frac{d\hat{B}_j^t}{dt} = -\beta_j Hu(\hat{B}_j u - y_j^{mes}) + \lambda H f(\hat{B}_j) \quad (1.13)$$

in which $\lambda \geq 0$.
Where $$f(\hat{B}_j) = \begin{pmatrix} f_0(B_j^{min} - \hat{B}_j(1)) \\ f_1(\hat{B}_j(1) - \hat{B}_j(2)) \\ \vdots \\ f_{m-2}(\hat{B}_j(m-2) - \hat{B}_j(m-1)) \\ f_{m-1}(\hat{B}_j(m-1) - \hat{B}_j(m)) \\ (0) \end{pmatrix} - \begin{pmatrix} f_1(\hat{B}_j(1) - \hat{B}_j(2)) \\ f_2(\hat{B}_j(2) - \hat{B}_j(3)) \\ \vdots \\ f_{m-1}(\hat{B}_j(m-1) - \hat{B}_j(m)) \\ f_m(\hat{B}_j(m) - B_j^{max}) \\ (0) \end{pmatrix}$$

And $$\forall i \in [|1, m-1|], f_i(y): \begin{cases} = 0 & \text{if } y \leq 0 \\ \geq 0 & \text{if } y \geq 0 \end{cases}$$

For equality constraints, this function f may thus take the following form, as matrix product of H (normalization), A (defined below) and estimates $B_j$:

$$\frac{d\hat{B}_j^t}{dt} = -\beta_j Hu(\hat{B}_j u - y_j^{mes}) + \lambda HA \hat{B}_j^t \quad (1.12)$$

The number of subassemblies of constituents, the properties j of which are the same, is denoted by m. Such a subassembly is referred to as a "set of equalities". The following matrix A, of size n×n, is introduced:

$$A = \begin{pmatrix} R_1 \\ \vdots \\ R_m \\ (0) \end{pmatrix}$$

in which:

$$R_i = \begin{pmatrix} 1 & -1 & 0 & \cdots & 0 \\ 0 & \ddots & \ddots & (0) & \vdots \\ (0) & \vdots & (0) & \ddots & \ddots & 0 & (0) \\ 0 & \cdots & 0 & 1 & -1 \\ -1 & 0 & \cdots & 0 & 1 \end{pmatrix}$$

According to a second variant, the matrix $\hat{B}$ is modified by replacing the initial equation (1) with an equation corresponding to the implementation of a new adaptation law represented by the following equation:

$$\frac{d\hat{B}_j^t}{dt} = -\beta_j H \frac{1}{\delta t} \int_{t-\delta t}^{t} u(\hat{B}_j u - y_j^{mes}) ds \quad (1.2)$$

in which $\delta t$ is the integration time window (i.e. the length of the time interval over which the average is taken) and s is the time variable under the integral.

Preferably, δt is smaller than the updating frequency of the estimates.

The corrected matrix $\hat{B}$ is thus determined using equation (1.2), which makes it possible to use a time average (sliding time window) integrating past commands. This system is preferably used in the case of sporadic measurements of the properties of the product resulting from mixing the constituents, these properties not being refreshed at each calculation period.

According to a third variant, the matrix $\hat{B}$ is modified by replacing the initial equation (1) with an equation corresponding to the implementation of a new adaptation law represented by the following equation:

$$\frac{d\hat{B}_j^t}{dt} = -\frac{\beta_j}{\delta t} H \int_{t-\Delta-\frac{\delta t}{2}}^{t-\Delta+\frac{\delta t}{2}} u(s)(\hat{B}_j u(s) - y_j^{mes}) ds \qquad (1.3)$$

in which δt is the integration time window, Δ is the measurement delay and s is the time variable under the integral.

The time variable s serves to work on a sliding time window around the delay Δ, a window of width δ.

In a second embodiment of the invention, the matrix $\hat{B}$ is modified by adding an additional term δ to at least one of equations (1), (1.1), (1.2) or (1.3) and corresponds to the following calculation:

$$\hat{B}complete_j^t = (\hat{B}_j^t + \delta) \qquad (1.4)$$

in which the vector δ satisfies the equation δ*u=0, so that the predictions are unchanged (iso-prediction) by virtue of the equation:

$$y = \hat{B}_j^t * u = (\hat{B}_j^t + \delta) * u \qquad (1.5)$$

$\hat{B}complete_j^t$ then replaces the corrected matrix $\hat{B}$ of step (ii) of the invention.

The vector δ is determined so as to ensure that the constraints on the mixture are complied with systematically, at each instant. It is defined property by property for the estimates of each constituent. This vector makes it possible in particular to distribute the observed deviation at the outlet of the system between the laboratory measurements of the properties of the constituents and the estimated properties of these constituents, this distribution being made over the input constituents and being directed preferentially towards a chosen direction, for example according to a new laboratory analysis, of the flowing-draining tank, etc.) without impairing the convergence properties of the method.

The calculation of δ may involve a direct algebraic calculation or a solution by optimization under constraints.

Depending on the choices made for calculating it, the vector δ serves to direct the estimated properties towards particular directions, such as for example the value of a new laboratory analysis of a constituent. This correction δ may also be used to give priority to the confinement of certain constituents coming from isolated tanks, the estimated properties of which have to remain close to their laboratory reference analysis, compared with those coming from flowing-draining tanks (tanks permanently fed with constituent), of properties that vary over time, subject to perturbations and for which it is advantageous to release the estimation system.

The calculation of δ may, apart from the iso-prediction constraint δ*u=0, take into account other constraints relating to the estimated properties of the constituents: equality of properties, limits on the properties, total or partial order relationships. The advantage of this system is that these various constraints are complied with at any instant, not only asymptotically.

The calculated value of δ is added to the matrix of the estimated properties of the constituents according to equation (1.4), either systematically at each iteration or in a conditional manner.

To take into account the step(s) of premixing constituents before constituting the mixture, the recipe u determined during operation (3) of step (ii) of the method according to the invention takes into account the delays due to the dead volumes present in the plant in the premixing zones.

This synchronization makes it possible to improve the production of the mixture and the meeting of the property setpoints of the mixture. It also makes it possible to reduce the manufacturing margins, and thus control the flows of constituents more precisely, and to prevent overquality. Finally, this more precise control of the constituent flows limits surging, and consequently improper stressing of the control members of the plant. This synchronization also provides greater robustness in variations of the total output of the mixer.

Advantageously, during the operation of correcting the matrix $\hat{B}$, the variable u used in one of the equations (1.1), (1.2), (1.3) and (1.4) employed is replaced with a variable U defined by the recipe vector U(t) taking into account the dead volumes at time t, such that:

$$U(t) = (U_1(t), \ldots U_n(t))^t$$

More particularly, in the first variant of the first embodiment of the modifications of the matrix $\hat{B}$, this is determined using the following equation:

$$\frac{d\hat{B}_j^t}{dt} = -\beta_j H U(t)(y_j(t) - y_j^{mes}(t)) + \lambda f(\hat{B}_j^t) \qquad (2.1)$$

with f and λ as defined with reference to equation (1.1) and $$y(t) = \sum_{i=1}^n U_i(t) b_i,$$

$b_i$ being the vector of the properties of constituent i.

In the second variant of the first embodiment of the modifications of the matrix $\hat{B}$, this is determined using the following equation:

$$\frac{d\hat{B}_j^t}{dt} = -\beta_j H \frac{1}{\delta t} \int_{t-\delta t}^t U(\hat{B}_j U - y_j^{mes}) ds \qquad (2.2)$$

In the third variant of the first embodiment of the modifications of the matrix $\hat{B}$, this is determined using the following equation:

$$\frac{d\hat{B}_j^t}{dt} = -\frac{\beta_j}{\delta t} H \int_{t-\Delta-\frac{\delta t}{2}}^{t-\Delta+\frac{\delta t}{2}} U(s)(\hat{B}_j U(s) - y_j^{mes}) ds \qquad (2.3)$$

in which δt is the integration time window, Δ is the measurement delay and s is the time variable under the integral.

In the second embodiment of the modifications of the matrix $\hat{B}$, the vector $\delta$ satisfies equation $\delta*U=0$, so that the predictions are unchanged (iso-prediction) by virtue of the equation:

$$y=\hat{B}_j^{\prime *}U=(\hat{B}_j^{\prime}+\delta)*U \qquad (2.5)$$

Advantageously, the command and output quantities involved in this equation are synchronized in order to take into account the premixing delay and the measurement delay.

This is because the premixing zones and the analysers cause delays. Depending on the property measured, the analyser delays may be considered as constants or variables, depending on the measured value. To compensate for these delays, the method according to the invention uses a synchronization system, which predicts the future values of the properties (on the basis of the characteristics of the constituents and of the last percentages calculated), knowing that the corresponding measurement that will be provided by the analyser is not yet available at this moment due to the analysis delay (which includes the delay in the sampling loop and the analyser delay).

For example, in the case of variable measurement delays, a look-up table for associating several values of delays in given operating intervals is used: a piecewise constant delay profile is then obtained, the level of delay varying automatically when the operating range is changed. This level of delay then causes a new synchronization of the predictions with the measurements.

Advantageously, in the control method according to the invention, the recipe u determined at the end of step (ii) is determined by means of an optimization procedure comprising sequential steps during the course of which the solution of a minimal problem respecting a minimum number of priority constraints is sought if a complete problem respecting all the constraints is unfeasible, the number of priority constraints to be respected increasing with each step until a recipe u respecting the maximum number of priority constraints is obtained.

These steps are, for example, the following:

(a)—determination of the solution of a complete regulation problem P0, this solution consisting of an optimized recipe u taking into account the constraints on the proportions of the constituents and the constraints on the properties of the mixture, if the complete regulation problem P0 is solvable, application of the recipe u—solution of P0;

(b)—if the complete regulation problem P0 is not solvable, determination of a recipe u for which a minimal regulation problem P1 is solved, which takes into account only the constraints on the problem P0 that are defined as priority constraints; this problem P1 involves a succession of normally feasible optimization problems, the criteria of which consist in penalizing the violation of said priority constraints so as to define achievable new values for these priority constraints;

(c)—if the minimal regulation problem P1 is solvable, determination of a recipe u for which a regulation problem P2 is solved, which takes into account said achievable new values of the priority constraints of the problem P0 and also the non-priority constraints of the problem P0; this problem P2 involves an optimization problem, the criteria of which consist in penalizing the violation of said non-priority constraints so as to define achievable new values for these non-priority constraints, if the minimal regulation problem P1 is not solvable, application of the current recipe u (that is to say, the recipe applied before the optimization of step (ii));

(d)—if the regulation problem P2 is solvable, determination of a recipe u for which a regulation problem P3 is solved, which takes into account said achievable new values of the priority constraints of the problem P0 that were obtained in step (b), said achievable new values of the non-priority constraints obtained in step (c) and also all the other non-priority constraints of the problem P0 that are not treated by the problems P1 and P2; this problem P3 involves a succession of normally feasible optimization problems, the criteria of which consist in penalizing the violation of said other non-priority constraints so as to define achievable new values for these other non-priority constraints, if the regulation problem P2 is not solvable, application of the recipe obtained by the problem P1; and (e) if the regulation problem P3 is solvable, the applied recipe is the solution of the problem P3, otherwise the recipe is the solution of the problem P2.

The optimization sequences (a) to (e) ensure optimum management of the priorities, which makes it possible to deal with unfeasible problems by degrading them so as to obtain a set of feasible constraints. These optimization sequences have the novelty of seeking the solution of a minimal problem if the complete problem is unfeasible, then progressively increasing the number of constraints, instead of progressively reducing the number of constraints as in the conventional optimization sequences. In this way, it is possible to obtain a recipe u that always meets as best as possible the constraints defined as being priority constraints.

Advantageously, the non-priority constraints dealt with by the problem P2 relate to the references and are called "regulation" constraints corresponding to the fixed-setpoint regulation equations.

Advantageously, steps (b) and (d) are themselves optimization sequences that can be divided into steps, as described below.

Step (b) preferably consists of steps ($b_i$) in which the hard (priority) constraints of decreasing rank are dealt with in succession. During each step ($b_i$), the aim is to find an optimum relaxation providing the value of all the hard constraints of the same rank i, which become achievable constraints, taking into account the priority constraints on the proportions of the bases and the achievable constraints on the properties of the mixture of rank j>i, optionally relaxed at steps $b_j$ preceding the current step $b_i$.

Step (d) preferably consists of steps ($d_i$) in which the soft (non-priority) constraints of decreasing rank are dealt with in succession. During each step ($d_i$), the aim is to find an optimum relaxation providing the value of all the soft constraints of the same rank i, which become achievable constraints, taking into account the priority constraints on the proportions of the bases, the achievable constraints on the properties of the mixture of hard rank, optionally relaxed at steps ($b_i$), the achievable constraints, in terms of regulation target, on the on-target regulated properties calculated in step (c) and, finally, the achievable soft constraints on the properties of rank j>i, optionally relaxed at steps d, preceding the current step $d_i$.

Advantageously, the optimization sequence may include an additional step during which, if the previous regulation problem P3 is solvable, a recipe u is determined for which the regulation problem P0 is solved taking into account said achievable new values determined during steps (b), (c) and (d).

It is thus possible to ensure optimized orientation of the calculated recipe, for example by maximizing or minimizing certain constituents, in a hierarchized manner, or by minimizing the deviation between the recipe to be calculated and the initial reference recipe, as soon as sufficient degrees of freedom are available.

In certain cases, this additional step makes it possible nevertheless to obtain an optimum orientation of the recipe in respect of all the partially degraded initial constraints although the initial complete problem was unfeasible.

Advantageously, the priority constraints taken into account for solving the problem P1 are constraints on the proportions of the constituents and constraints on the properties of the mixture.

The constraints on the proportions of the constituents especially include simple limits on the proportions of the constituents and a constraint on the sum of the proportions of the constituents. The priority constraints on the properties of the mixture are optionally relaxed during the preceding iterations of P1. The desired solution is a recipe u for taking into account the optionally relaxed priority constraints on the properties of the mixture.

If the method is intended for a plant for producing a mixture of n constituents and of additives, for a property j of the mixture on which the additive has an influence, the control model takes into account the effect d of the additive addition during operations (2) and (3) of step (ii) according to: $y_j = \hat{B}_j u + d$.

The invention also relates to a system for producing and controlling a mixture of constituents, comprising transport channels for transporting the constituents to be mixed into a main channel connected to the place for receiving the mixture, means for controlling the flow rates of the constituents in each transport channel, means for continuously measuring, in the main channel, representative parameters of the mixture being produced, and means for calculating the proportions of the various constituents involved in the mixture, an estimator connected to the calculation means, the estimator comprising programmed means for producing an estimate of the properties of the constituents using the measurements of the properties of the mixture that are measured by the measurement means, the calculation means comprising programmed means for calculating, by means of this estimate, the proportions of the various constituents involved in the mixture so as to obtain a mixture having predetermined properties, this system being characterized in that the estimator comprises programmed means for introducing at least one constraint corresponding to limit, order relationship and/or equality constraints on at least one of the properties for correcting the matrix $\hat{B}$ of step (ii) of the method according to the invention.

By "continuous measurement means" it is to be understood that the means are capable of implementing a continuous measurement procedure, as defined above.

Advantageously, the estimator comprises programmed means for implementing steps (i) and (ii) of the method according to the invention, integrating additional external information such as the latest laboratory analyses of the tanks of constituents, the flowing-draining tank indicators and the tank utilization targets in terms of tendency (maximization/minimization of incorporation into the mixture) and in terms of relative priorities of applying intended incorporation tendency targets.

Advantageously, the estimator includes programmed synchronization means for taking into account the delays due to the dead volumes in the zones for premixing at least two constituents of the mixture.

As a variant, the estimator includes programmed synchronization means for taking into account the delays due to the dead volumes in various stages, at least one stage consisting of one or more zones for premixing at least two constituents of the mixture.

In other words, a stage is located between an inflow of constituents, whether mixed or not, and an outflow of constituents, whether mixed or not, and includes at least one premixing of at least two incoming constituents (it being possible for each of these constituents itself to be a mixture of constituents) delivering a premix of these constituents as output.

Preferably, these synchronization means are programmed to implement equation (2) of operation (2) of step (ii) of the method according to the invention in order to produce a mixture of constituents, in which at least one premix of at least two of the constituents is produced before the mixture is produced.

Advantageously, the system includes an optimizer connected to the calculation means and to a mixture-objectives storage means, the optimizer including programmed means for optimizing the recipe u of the proportions of the constituents and said recipe being determined by the calculation means as a function of the mixture objectives stored in said storage means.

Preferably, the optimizer then includes programmed means for implementing the optimization procedure of the production method described above.

Advantageously, the system includes at least one additive tank connected via a transport channel to the main channel, downstream of the zone for mixing the constituents, a means for controlling the additive flow rate associated with the tank provided in the transport channel, and an additive injection controller connected to said control means, to the optimizer and to the mixture-objectives storage means, the additive injection controller being capable, for a property j of the mixture on which an additive has an influence, of optimizing the proportion of the additive so as to regulate said corresponding property j of the mixture, taking into account a target supplied by the mixture-objectives storage means.

BRIEF DESCRIPTION OF THE DRAWINGS

The invention will now be described by means of examples and with reference to the appended non-limiting drawings in which:

FIGS. 6a-6e show the variation, as a function of time, of the proportions of the bases (FIG. 6a) and of the qualities of the petrol mixture of example 8, namely the RVP regulations (FIG. 6b) and RON regulations (FIG. 6c) and monitoring of the zone for the percentage distilled (FIG. d) and for the benzene content (FIG. 6e);

FIGS. 7a-7f represent the variation, as a function of time, of the following parameters of the gasoil mixture with regulation by the injection of additives of example 9:

FIG. 7a: injection profile of the dope influencing the cetane number,

FIG. 7b; injection profile of the dope influencing the filterability,

FIG. 7c: ratio of bases 1 and 3 used in the production of the mixture,

FIG. 7d: cetane number of the mixture,

FIG. 7e: filterability of the mixture, and

FIG. 7f: sulphur content of the mixture.

DESCRIPTION OF THE PREFERRED EMBODIMENTS

The invention will be described below in the case of oil plants for producing mixtures containing defined proportions of several available bases or constituents, so that the combination of the properties of these bases gives the mixture the desired properties complying with the extremes or a setpoint value.

Figure 1:
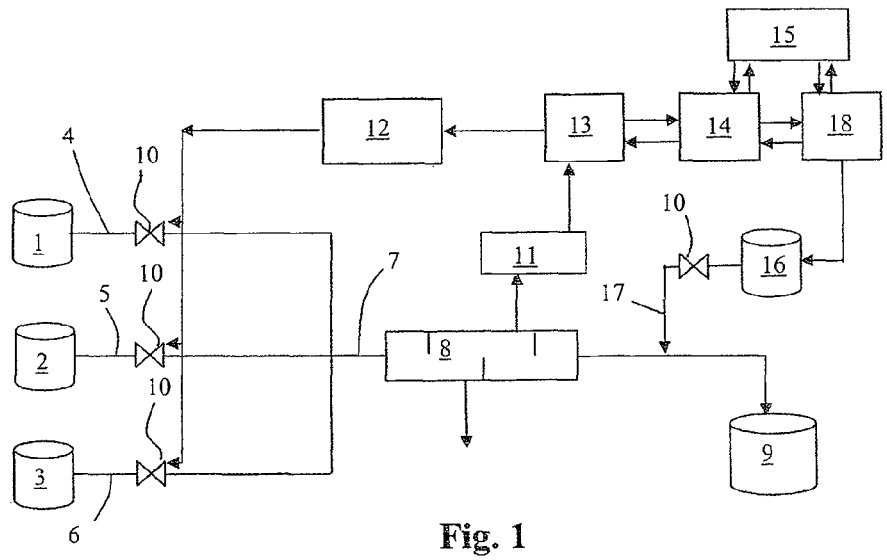
FIG. 1 is a schematic representation of a system for producing a mixture of products according to the invention.

FIG. 1 shows a diagram of a system for controlling the production of a mixture of products according to the invention.

The constituents or bases of the mixture are contained in tanks 1, 2, 3, the number of which has been limited to three for ease of representation. The constituents to be mixed are conveyed along transport channels 4, 5, 6 to a main channel 7 provided with a mixer 8, the main channel conveying the mixture to a holding tank 9. Means denoted by the reference 10 in FIG. 1 are used to control the flow rates of the bases in each transport channel. These are for example flow regulators controlling a valve.

Analysis means 11, or continuous measurement means, are used for repeatedly measuring the representative parameters of the mixture during its production. These means 11 consist for example of in-line analysers connected to the mixer 8 located in the main channel 7.

In the case of a mixture of oil products, these analysers measure for example the sulphur content of the mixture (sulphur measurement), the octane number (octane engine test), the cetane number (cetane engine test), etc.

The plant also includes means 12 for calculating the proportions (recipe u) of the bases involved in the mixture, an estimator 13 and an optimizer 14 for determining a recipe u of the proportions of the bases, which will be sent to the control means 10.

The role of the estimator 13 is to estimate the properties of the bases on the basis of the analyses of the properties of the mixture performed by the analysis means 11, the calculation means 12 comprising programmed means for calculating, by means of this estimate and of setpoint values of these properties or values of constraints associated with these properties, the proportions of the various bases involved in the mixture, so as to obtain a mixture having predetermined properties. The proportions of the bases to be applied are calculated repeatedly, at predetermined time intervals, which are not necessarily equal (for example around 5 minutes), thus allowing the properties of the mixture to be precisely controlled.

The estimator 13 includes programmed means for implementing the operations of determining the properties of the constituents, forming part of the method of producing the mixture according to the invention described above.

The role of the optimizer 14 is to optimize a recipe u of the proportions of the bases from the estimated properties of the bases, from constraints on the recipe u and from constraints on the properties of the mixture. The recipe u thus optimized can serve for operating the control means 10.

The optimizer 14 includes programmed means for implementing the method of optimizing the calculated recipe for implementation by the estimator of the control method according to the invention.

The system furthermore includes a mixture-objectives storage means 15. This mixture-objectives storage means contains the various objectives set by the user in order to obtain the desired mixture. It is connected to the optimizer 14 so as to transmit the desired targets for each mixture.

In the example, these are the initial reference recipe, targets of the setpoint type or high and low limits on the properties, minimum/maximum constraints on the proportions of constituents, minimum/maximum desired orientations on the constituents, the volume to be manufactured and the chosen mode of regulation (instantaneous mode, integrated mode or tank-integrated mode, as will be defined later).

The system according to the invention may also include an additive tank 16 connected via a transport channel 17 to the main channel 7, downstream of the mixer 8. A means 10 for controlling the additive flow rate is also provided in the transport channel 17. This means 10 is actuated by an additive injection controller 18 connected to the optimizer 14 and to the mixture-objectives storage means 15.

The role of the additive injection controller 18 is to optimize a recipe for dope injection from the tank 16, so as to regulate a given property, in parallel with optimization of the recipe of constituents 1 to 3 performed by the optimizer 14, knowing that, in the event of saturation of dope injection (for example when a consumption limit predefined by users has been reached), automatic switching of the dope-regulated property takes place on the multivariable regulation by acting on the proportions of the constituents, this being controlled by the optimizer 14.

Of course, several additive tanks 16 may be envisaged.

The system according to the invention may operate in two modes:

Integrated-Analysis Control (Integrated Mode)

This control is well suited for the case in which the mixture flows into an isolated end-product tank (holding tank). In this case, it is the average quality integrated over the entire tank that is controlled.

The proportions of the bases are then controlled so as to modify the instantaneous properties of the mixture in order to compensate for the deviations in quality of the mixture observed in the past, so as to bring the properties of the entire mixture contained in the holding tank to the setpoint values, or to within the constraints.

The actions for controlling the proportions of the bases then increase at the same time as the volume of the mixture in the holding tank.

A distinction is made here between "mixture-integrated" mode and "tank-integrated" mode. The latter mode takes into account the volume and quality of the initial tank bottom before mixing, whereas the "mixture-integrated" mode operates on the manufactured product flowing from the mixer, the qualities of this mixture product to be controlled being integrated, that is to say cumulated or averaged from the onset of mixing.

Instantaneous-Analysis Control (Instantaneous Mode)

This control is well suited in the case in which the mixture flows directly into an oil pipeline, a ship, a train or a lorry. It is then important for the instantaneous values of the analyses to be permanently kept close to the setpoints or within the constraints. In this case, the actions for controlling the proportions of the bases are independent of the volume of mixture that has flowed.

The operation of the property estimator 13 is independent of the regulation mode chosen, whether instantaneous or integrated. In both modes, the estimator calculates, instantaneously and synchronously, a prediction of the properties, which can then be used by the optimizer 14. The optimization procedure employed by the optimizer uses regulation equations explained later, which involve either a setpoint corresponding directly to the desired target in instantaneous mode, or a reference calculated over a path modulated by an adjustable horizon in integrated mode.

Examples 1.1 to 1.5, 2.1, 2.2 and 3 to 5 describe formulae that can be used to implement the invention.

These examples relate, respectively, to the following: feedback without premixing (Examples 1.1 to 1.5); feedback with premixing (Examples 2.1 and 2.2); optimization sequences (Example 3); management in integrated mode (Example 4); regulation by additives (Example 5).

The feedback described in example 1.1 takes into account the in-line analysers, this being the basis of the regulation principle. In particular, it estimates, in real time, the properties of the constituents, using a mechanism for correcting the properties of the constituents according to a preferential orientation (new laboratory analysis of the properties of the constituents) or not.

Examples 1.1 to 1.5 serve to describe a family of particular feedback solutions introducing constraints on the estimated properties (Examples 1.2 to 1.5) according to a preferential orientation without impairing the convergence properties of the entire system.

This feedback is supplemented in example 2.1 so as to allow synchronization of the control, in the case of multiple premixing, in parallel (at the same stage) or in series (in several successive premixing stages). This allows a more robust control to be obtained in practice, as this is less subject to oscillations resulting from any lack of synchronization between measurement and prediction, and its use to be enlarged for constituent premixing cases.

Example 2.2 is similar to example 2.1, but corresponds to a particular solution for formalization and implementation of a generic topology with multiple premixing upstream of the mixer.

The feedback procedures presented in examples 1.1 to 1.5 or 2.1, 2.2 are used to calculate the predictions of the properties of the mixture. These predictions are used as constraint equations in optimization sequences, such as those presented in example 3, and make it possible to calculate the appropriate control for achieving the objectives set for the mixture.

Examples 1.1 to 1.5 or 2.1, 2.2 and example 3 therefore describe an example of a required processing chain in instantaneous mode.

Example 4 makes it possible to provide a specific complement to the processing in integrated mode, which uses the operating diagram of the instantaneous mode presented with reference to examples 1.1 to 1.5, 2.1, 2.2 and 3, by modifying the thresholds (relaxation of the instantaneous constraint values) and modifying the references (setpoints modified via reference paths).

Example 5 describes regulation by additive injection, which is added to the mechanisms of examples 1.1 to 1.5 or 2.1, 2.2 and example 3 and which may use mechanisms similar to those of the integration mode described in example 4. The principle of switching regulation toward the bases y is mentioned, which corresponds to a pathway from the mechanism described in example 5 to that described in examples 1 to 3.

Example 6 describes various recipe optimization options.

In the case of a mixture of n bases (or constituents), the following notations are used:

u, a vector of dimension n, is the recipe to be calculated and $\bar{u}$ is the reference recipe. The recipe represents the proportions of the various bases involved in the mixture: $u \in [0,1]^n$ and $$\sum_{i=1}^{n} u_i = 1;$$

y, a vector of dimension m, represents the m estimated properties of the mixture for the recipe u;

$y_j^{mes}$ represents the measurement of the property j, with $y_j^{mes} = B_j u$, assuming linear mixing laws. It may be noted here that the equality y=Bu applies only in the case without premixing (dynamic or steady-state, that is to say in transient or steady-state mode) and in the steady-state case if there is premixing;

B is the m×n matrix of the properties of the constituents of the mixture; and $\hat{B}$ is the estimate of B used in the calculations, in such a way that $y = \hat{B}u$.

The current properties y of the mixture at the exit of the mixer are called instantaneous properties. They are measured by the in-line analysers.

The current properties of the flowed product, denoted by z, are called integrated properties.

The current properties of a holding tank for the mixture, denoted by zfb, are called tank bottom-integrated properties.

Example 1.1

Feedback without Premixing, Control in Instantaneous Mode

The aim of this example is to show how equation (1), used for implementing operation (2) of step (ii) of the method for producing and controlling a mixture, makes it possible to calculate a matrix of estimation of the base properties. This example corresponds to the case in which the bases are mixed directly, in order to produce the mixture without premixing.

Defining the following dynamic system for updating $\hat{B}_j$ on the basis of u and the measurement $y_j^{mes}$:

$$\frac{d\hat{B}_j^t}{dt} = -\beta_j Hu(y_j - y_j^{mes}) \qquad (1)$$

where the matrix H is a positive definite symmetric matrix and equal in this example to:

$$\frac{1}{\|\bar{u}\|} \begin{pmatrix} \frac{1}{\bar{u}_1} & & \\ & \ddots & \\ & & \frac{1}{\bar{u}_n} \end{pmatrix}$$

$B_j^t$ is the transpose of $B_j$, and
$\beta_j$ is a strictly positive real number,
it is possible to show that the function is $$\psi(\hat{B}_j) = \frac{1}{2}(\hat{B}_j - B_j)H^{-1}(\hat{B}_j - B_j)^t$$

a Lyapunov function for the dynamic system (1). This is because it is positive and its derivative as a function of time is negative:

$$\frac{d\psi}{dt} = -\beta_j(y_j - y_j^{mes})^2.$$

Therefore $\hat{B}_j^t$ tends towards the largest invariant set by the dynamic system (1) lying within $\{\hat{B}_j^t$ such that $d\psi/dt=0\}$. Thus, $\hat{B}_j^t$ tends towards a value such that $y_j = y_j^{mes}$, which is equivalent by definition to $\hat{B}_j u = B_j u$. Nevertheless, since the values of u are bound by the constraint $$\sum_{i=1}^{n} u_i = 1,$$

it is not possible to conclude that $\hat{B}_j$ and $B_j$ are equal.

However, when an optimization problem includes a constraint $\hat{B}_j u = y_j^{ref}$ and when a solution does exist, then $y_j^{mes} = y_j^{ref}$ asymptotically. Similarly, the inequality constraints posed on the estimate $y_j$ are respected by the measurement $y_j^{mes}$.

The use of the dynamic system (1) for updating the properties of the mixture thus constitutes a feedback system which makes it possible to avoid, in the case of the outputs, shifts between estimates and measurements.

A variant in the use of the dynamic system (1) would be to use an initial reference recipe deviation term e and not a recipe u term in the estimate differential equation.

When the measurement is delayed, and the delay is known, it is sufficient to synchronize the quantities u, $y_j$ and $y_j^{mes}$ in order for the convergence properties to remain valid.

Apart from the analyser measurement delays, the synchronization may take into account the constituent delay(s) upstream of the mixer.

Such a delay is for example observed in the case of pre-mixing the constituents, as described below.

Example 1.2

Feedback with Return of the Estimate to the Latest Laboratory Analysis

Corrective terms δ that do not affect the final value of the predicted property (iso-prediction) may be added to the estimate $\hat{B}_j^t$ described in Example 1.1. In this example, these corrections are introduced in order to take into account new laboratory measurements.

For each property, $\overline{B}_j$ refers to the new laboratory measurements of the bases. To calculate the corrective term δ, the following constrained minimization problem is considered:

$$\min_{\delta} \frac{1}{2} \|\delta + \hat{B}_j - \overline{B}_j\|^2$$

$$\delta u = 0$$

The single constraint guarantees the iso-prediction: $\hat{y}_j = \hat{B}_j u = (\hat{B}_j + \delta)u$. This minimization problem can be solved explicitly using a Lagrangian. The unique solution of the problem is:

$$\delta_{sol} = \overline{B}_j - \hat{B}_j - \frac{(\overline{B}_j - \hat{B}_j)u}{\|u\|^2}u^T$$

It is this correction to the matrix of the estimates of the properties of the constituents that is applied systematically at each iteration or from time to time depending on the conditional tests.

Example 1.3

Feedback with the Constraints on the Estimates in the Adaptation Law Taken into Account Subexample 1.3.A: Limit Management We consider here a set of inequality constraints of the minimum/maximum type which it is desired that the matrix of the estimates of the properties of the constituents should respect asymptotically. For each property j, a non-empty interior admissible interval $\lfloor B_j^{min}, B_j^{max} \rfloor$, assumed to contain the set of actual values of the properties of the constituents: $\forall i \in \{\text{base space}\}, B_j(i) \in \lfloor B_j^{min}, B_j^{max} \rfloor$, in which $B_j(i)$ denotes the ith component of the vector $B_j$, is considered. Also considered is a regular function $f_j$ which makes an actual output value $f_j(x)$ having the following characteristics:

$f_j(x)=0$ if $x \in [B_j^{min}, B_j^{max}]$ $f_j(x) \leq 0$ if $x \geq B_j^{max}$ $f_j(x) \geq 0$ if $x \leq B_j^{min}$ correspond to an actual input value x.

The differential equation (1.11) is then considered:

$$\frac{d\hat{B}_j^t}{dt} = -\beta_j H u(\hat{B}_j u - y_j^{mes}) + f(\hat{B}_j^t) \qquad (1.11)$$

in which f is the column vector, the coordinates of which (here the ith) are written as $f(\hat{B}_j^t)(i) = f_j(\hat{B}_j(i))$.

This equation (1.11) corresponds to equation (1.1) described above in the case in which the weighting factor λ is equal to 1.

Therefore, for any initial condition, the solution of the differential equation (1.11) converges asymptotically with time towards the set:

$\{\hat{B}_j(i) \in [B_j^{min}, B_j^{max}], \forall i \in \{\text{base space}\}, \hat{B}_j u = B_j u\}$ Convergence is achieved by the following Lyapunov function:

$$\Psi(\hat{B}_j) = \frac{1}{2}(\hat{B}_j - B_j)H^{-1}(\hat{B}_j - B_j)^T$$

$$\Psi(B_j) = 0$$

$$\Psi(\hat{B}_j) > 0, \text{ for } \hat{B}_j \neq B_j$$

$$\frac{d\Psi}{dt} = -\beta_j(\hat{y}_j - y_j)^2 + \lambda(\hat{B}_j - B_j)H^{-1}f(\hat{B}_j)^T \leq 0$$

By assumption, for all the coordinates i: $B_j(i) \in [B_j^{min}, B_j^{max}]$ and:

$$(\hat{B}_j(i) - B_j(i))f(\hat{B}_j(i)) = \begin{cases} 0 & \hat{B}_j(i) \in [B_j^{min}, B_j^{max}] \\ \leq 0 & \hat{B}_j(i) < B_j^{max} \\ \leq 0 & \hat{B}_j(i) > B_j^{min} \end{cases}$$

Since the matrix H is a positive definite diagonal matrix, the solution of the differential equation converges on the following set:

$$\left\{\hat{B}_j \Big| \frac{d\Psi}{dt} = 0\right\} = \{\hat{B}_j \mid \hat{B}_j(i) \in [B_j^{min}, B_j^{max}], \forall i \in \{\text{base space}\}, \hat{B}_j u = B_j u\}$$

In Subexample 1.3.B: Equality Constraints Management

A set of equality constraints that it is desired that the matrix of the estimates of the constituent properties should respect asymptotically is considered here.

Addition of an Additional Term in the Differential Equation

The differential equation (1.11), in which f would be chosen to be identically zero, does not provide identical evolutions for equal bases.

For each property, in the case having two initially identical bases, the solution is based on:

$$b_1 = b_2 \Leftrightarrow b_1 - b_2 = 0 \Leftrightarrow b_2 - b_1 \leq 0 \text{ and } b_1 - b_2 \leq 0$$

Therefore $$b_1 = b_2 \Leftrightarrow \begin{pmatrix} -1 & 1 & (0) \\ 1 & -1 & (0) \end{pmatrix} \begin{pmatrix} b_1 \\ b_2 \\ \vdots \end{pmatrix} \leq 0$$

With three bases, the following is similarly obtained:

$$b_1 = b_2 = b_3 \Leftrightarrow \begin{cases} b_1 - b_2 = 0 \\ b_2 - b_3 = 0 \end{cases} \Leftrightarrow \begin{pmatrix} -1 & 1 & 0 & (0) \\ 0 & -1 & 1 & (0) \\ 1 & 0 & -1 & (0) \end{pmatrix} \begin{pmatrix} b_1 \\ b_2 \\ b_3 \\ \vdots \end{pmatrix} = 0$$

In general, the number of subassemblies of constituents, the properties j of which are the same, is denoted by m. Such a subassembly is designated as a "set of equalities". The number of constituents associated with the set of equalities i is called n, and note that $N_i$ is calculated as follows $$N_i = \sum_{k=1}^{i-1} n_k.$$

The following matrix A, of n×n size, is introduced:

$$A = \begin{pmatrix} R_1 \\ \vdots \\ R_m \\ (0) \end{pmatrix}$$

in which:

$$R_i = \begin{pmatrix} 1 & -1 & 0 & \cdots & 0 \\ 0 & \ddots & \ddots & (0) & \vdots \\ (0) & \vdots & (0) & \ddots & \ddots & 0 & (0) \\ 0 & \cdots & 0 & 1 & -1 \\ -1 & 0 & \cdots & 0 & 1 \end{pmatrix}$$

Each matrix $R_i$ is of $n_i \times n$ size. A is a diagonal matrix by blocks.

The particular new adaptation law (1.12) below is considered:

$$\frac{d\hat{B}_j^t}{dt} = -\beta_j Hu(\hat{B}_j u - y_j^{mes}) + \lambda HA\hat{B}_j^t \quad (1.12)$$

in which $\lambda \geq 0$.

A set of equalities with k equal bases (k>1) is considered. Even if permutations are made, it is assumed that these are the k first bases. The n×n square matrix $A_k$ defined on the basis of a non-zero block of size k×k by:

$$A_k = \begin{pmatrix} -1 & 1 & 0 & \cdots & 0 \\ 0 & \ddots & \ddots & & (0) \\ \vdots & & \ddots & \ddots & \\ 0 & (0) & & -1 & 1 & (0) \\ 1 & 0 & \cdots & 0 & -1 \\ & & (0) & & & (0) \end{pmatrix}$$

is introduced.

The following equality may then be written:

$$(\hat{B}_j - B_j)A_k\hat{B}_j^T = -\frac{1}{2}\left[\sum_{i=1}^{k-1}(\hat{B}_j(i+1) - \hat{B}_j(i))^2 + (\hat{B}_j(1) - \hat{B}_j(k))^2\right] \quad (33)$$

Consider the following Lyapunov function:

$$\Psi(\hat{B}_j) = \frac{1}{2}(\hat{B}_j - B_j)H^{-1}(\hat{B}_j - B_j)^T$$

$$\Psi(B_j) = 0$$

$$\Psi(\hat{B}_j) > 0, \text{ for } \hat{B}_j \neq B_j$$

-continued $$\frac{d\Psi}{dt} = -\beta_j(\hat{y}_j - y_j)^2 + \lambda(\hat{B}_j - B_j)A\hat{B}_j^T \leq 0$$

From equation (33), we may write:

$$(\hat{B}_j - B_j)A\hat{B}_j^T = \sum_{i=1}^{m}(\hat{B}_j - B_j)R_i\hat{B}_j^T$$

$$= -\frac{1}{2}\sum_{i=1}^{m}\left[\left(\sum_{k=1}^{n_i-1}(\hat{B}_j(N_i+k+1) - \hat{B}_j(N_i+k))^2\right) + (\hat{B}_j(N_i+1) - \hat{B}_j(N_i+n_i))^2\right]$$

The solution of the differential equation therefore converges on the following set:

$$\left\{\hat{B}_j \mid \frac{d\Psi}{dt} = 0\right\} = \{\hat{B}_j \mid \hat{y}_j = y_j \text{ and } \forall i \in \{1, \ldots, m\},$$
$$\forall (k, l) \in \{N_i+1, \ldots, N_{i+1}\}^2, \hat{B}_j(k) = \hat{B}_j(l)\}$$

Subexample 1.3.C: Order Relationship Management

A set of order relationships that it is desired that the matrix of the estimates of the constituent properties should respect asymptotically is considered here.

For each property j, an order relationship is considered that relates, without loss of generality (to within a reordering operation) to the m first bases. This order relationship is partial if m<n and complete if m=n, n being the number of bases. This therefore means that: $B_j(1) \leq \ldots \leq B_j(m)$.

Consider m−1 functions having the following characteristics:

$$\forall i \in \{1, \ldots, m-1\}, f_i(x): \begin{cases} = 0 & \text{if } x \leq 0 \\ \geq 0 & \text{if } x \geq 0 \end{cases}$$

The vector function having n components is denoted by f, defined by:

$$f(\hat{B}_j) = \begin{pmatrix} 0 \\ f_1(\hat{B}_j(1) - \hat{B}_j(2)) \\ \vdots \\ f_{m-2}(\hat{B}_j(m-2) - \hat{B}_j(m-1)) \\ f_{m-1}(\hat{B}_j(m-1) - \hat{B}_j(m)) \\ (0) \end{pmatrix} - \begin{pmatrix} f_1(\hat{B}_j(1) - \hat{B}_j(2)) \\ f_2(\hat{B}_j(2) - \hat{B}_j(3)) \\ \vdots \\ f_{m-1}(\hat{B}_j(m-1) - \hat{B}_j(m)) \\ 0 \\ (0) \end{pmatrix}$$

The particular differential equation (1.13) is then considered:

$$\frac{d\hat{B}_j^t}{dt} = -\beta_j Hu(\hat{B}_j u - y_j^{mes}) + \lambda Hf(\hat{B}_j) \qquad (1.13)$$

in which $\lambda \geq 0$.

The limit constraints may be easily introduced into the order relationship by adding two positive functions having positive real values, and zero otherwise, thereby giving:

$$f(\hat{B}_j) = \begin{pmatrix} f_0(B_j^{min} - \hat{B}_j(1)) \\ f_1(\hat{B}_j(1) - \hat{B}_j(2)) \\ \vdots \\ f_{m-2}(\hat{B}_j(m-2) - \hat{B}_j(m-1)) \\ f_{m-1}(\hat{B}_j(m-1) - \hat{B}_j(m)) \\ (0) \end{pmatrix} - \begin{pmatrix} f_1(\hat{B}_j(1) - \hat{B}_j(2)) \\ f_2(\hat{B}_j(2) - \hat{B}_j(3)) \\ \vdots \\ f_{m-1}(\hat{B}_j(m-1) - \hat{B}_j(m)) \\ f_m(\hat{B}_j(m) - B_j^{max}) \\ (0) \end{pmatrix}$$

If we consider only the order relationship, this amounts to stating that:

$$B_j^{min} = -\infty \text{ and } B_j^{max} = +\infty$$

The convergence of this new estimator is established by virtue of the following Lyapunov function:

$$\Psi(\hat{B}_j) = \frac{1}{2}(\hat{B}_j - B_j)H^{-1}(\hat{B}_j - B_j)^T$$

$$\Psi(B_j) = 0$$

$$\Psi(\hat{B}_j) > 0, \text{ for } \hat{B}_j \neq B_j$$

$$\frac{d\Psi}{dt} = -\beta_j(\hat{y}_j - y_j)^2 + \lambda(\hat{B}_j - B_j)f(\hat{B}_j)^T \leq 0$$

The second term of the derivative can be expressed as follows:

$$(\hat{B}_j - B_j)f(\hat{B}_j)^T =$$
$$\sum_{i=1}^{m-1}\left((B_j(i) - B_j(i+1)) + (\hat{B}_j(i+1) - \hat{B}_j(i))\right)f_i(\hat{B}_j(i) - \hat{B}_j(i+1))$$

$\forall i \in \{1, \ldots, m-1\}$, the terms of the sum being given by:

$$B_j(i) - B_j(i+1))f_i(\hat{B}_j(i) - \hat{B}_j(i+1)) + (\hat{B}_j(i+1) - \hat{B}_j(i))f_i(\hat{B}_j(i) - \hat{B}_j(i+1))$$

By assumption, the first term is again negative since $B_j(1) \leq \ldots \leq B_j(m)$ and $f_i$ is positive. The second term of the sum is negative or zero:

$$(\hat{B}_j(i+1) - \hat{B}_j(i))f_i(\hat{B}_j(i) - \hat{B}_j(i+1)) \rightarrow \begin{cases} = 0 & \text{if } \hat{B}_j(i+1) - \hat{B}_j(i) \geq 0 \\ \leq 0 & \text{if } \hat{B}_j(i+1) - \hat{B}_j(i) \leq 0 \end{cases}$$

The solution of the differential equation therefore converges on a set characterized by the LaSalle invariance principle. This set is the following:

$$\left\{\hat{B}_j \mid \frac{d\Psi}{dt} = 0\right\} = \{\hat{B}_j \mid \hat{y}_j = y_j \text{ and } \hat{B}_j(1) \leq \ldots \leq \hat{B}_j(m)\}$$

Comments with Regard to the Subexamples

The formulation taking the limits into account gives several degrees of freedom: namely the values of the limits, the function f and the weighting factor λ. An example of the choice of function for subexample 1.3.A is given by:

$$f(\hat{B}_j) = \max(0, \hat{B}_j) + \min(0, B_{max} - \hat{B}_j)$$

Figure 8:
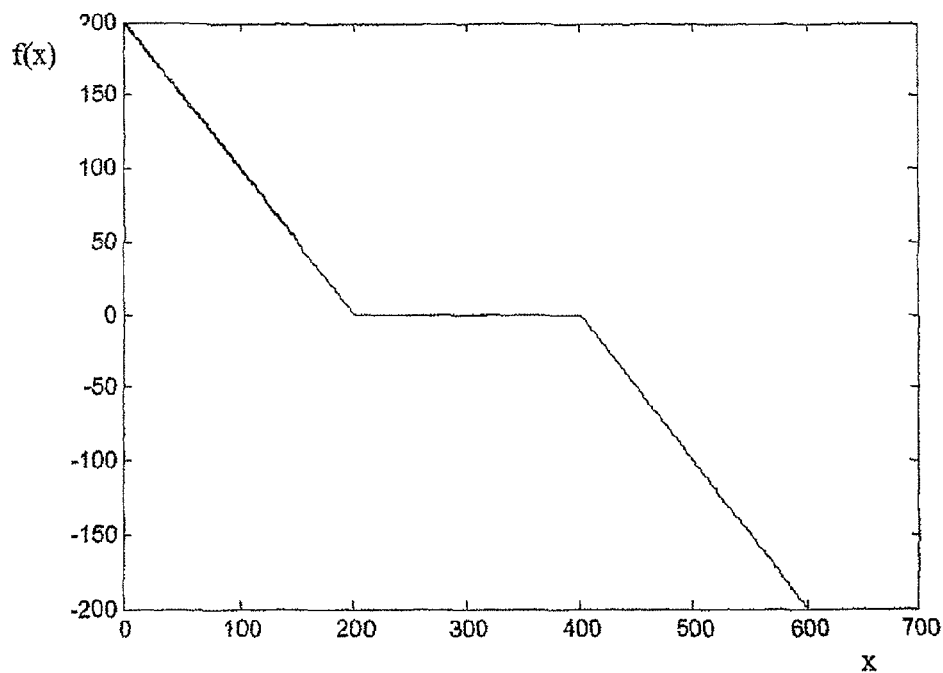
FIG. 8 represents the plot of the function f described in example 1.3.A.

The graph of this function is reproduced in FIG. 8 with $B_{min} = 200$ and $B_{max} = 400$.

The weighting factor λ may be chosen from the following list, depending on the form adopted for the function $f$.

Linear function of the form $f(\hat{B}_j)=\max(0, B_{min}-\hat{B}_j)+\min(0, B_{max}-\hat{B}_j)$ as shown in FIG. 8.

$$1/dt$$

$$\beta_j \frac{H}{\max(H)} \frac{1}{dt}$$

$$\frac{H}{\max(H)} \frac{1}{dt}$$

Logarithmic function of the form $$f(\hat{B}_j) = \ln\left(\frac{1+\max(0, B_{min}-\hat{B}_j)}{1+\max(0, \hat{B}_j - B_{max})}\right)$$

$$1/dt$$

$$2/dt$$

$$\beta_j \frac{H}{\max(H)} \frac{1}{dt}$$

$$2\beta_j \frac{H}{\max(H)} \frac{1}{dt}$$

In-Refinery Application

Figure 9:
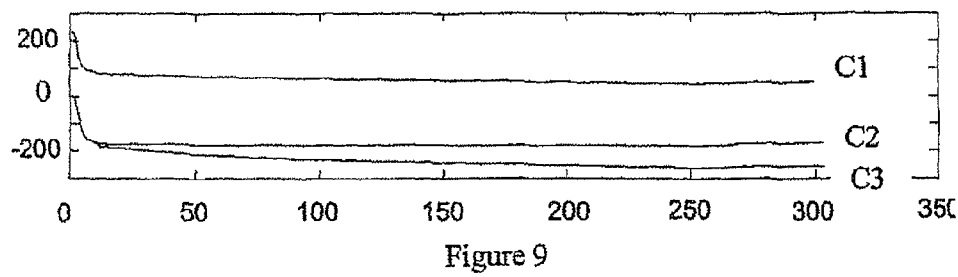
FIG. 9 represents the estimated sulphur property using an estimator according to the Applicant's previous application.

FIG. 9 shows the estimated amount of sulphur (in ppm) as a function of the discretized time, corresponding to the number of recipe correction iterations from the start of mixing, obtained by implementing equation (1).

This application relates to fuel oil manufacture with a mixture having three constituents, in order to regulate two qualities and as particular feature the fact that one of the constituents is associated with an erroneous initial quality value.

In this figure:
curve C1 shows the estimate of the sulphur content of constituent 1 of the mixture (erroneous initial value);
curve C2 shows the estimate of the sulphur content of constituent 2 of the mixture; and
curve C3 shows the estimate of the sulphur content of constituent 3 of the mixture.

Here it is found that the estimator of equation (1) arrives at detecting the erroneous value (overestimate), which is corrected downwards, but this correction is insufficient and a residual deviation distribution on the other estimated qualities results in negative estimates of the sulphur content (which by definition must remain positive or zero).

Figure 10:
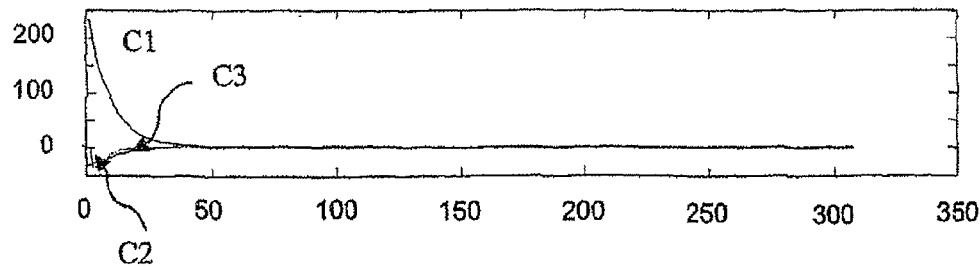
FIG. 10 represents the estimated sulphur property using an estimator corrected according to the present invention by a vector δ.

FIG. 10 shows the estimated amount of sulphur (in ppm) as a function of discretized time, corresponding to the number of recipe correction iterations since the start of mixing, using the adaptation law implemented by equation (1.1) corrected by the δ as defined by equation (1.4), defined above, and more precisely described in section 1.4 C of example 1.4 below.

Here it is found that the modified estimator arrives at correcting the erroneous value (overestimate), while keeping the other estimated qualities positive.

Finally it is found that by adding the term δ, curves C1 to C3 converge.

Example 1.4

Feedback with Distribution Constraints on the Properties Estimated by the Corrective Delta This example relates to the iso-prediction calculation of a vector δ in order to confer certain characteristic properties on the estimates. This vector is added to the matrix of the estimated properties of the constituents, either systematically at each iteration or in a conditional manner.

Subexample 1.4.A: Equality Constraint Management

For a relevant property, which has the same value for two bases ($b_1=b_2$), the solution is based on:

$$b_1 = b_2 \Leftrightarrow b_1 - b_2 = 0 \Leftrightarrow (1 \quad -1 \quad (0)) \begin{pmatrix} b_1 \\ b_2 \\ \vdots \end{pmatrix} = 0$$

With three bases, the following is obtained in the same manner:

$$b_1 = b_2 = b_3 \Leftrightarrow \begin{cases} b_1 - b_2 = 0 \\ b_2 - b_3 = 0 \end{cases} \Leftrightarrow \begin{pmatrix} 1 & -1 & 0 & (0) \\ 0 & 1 & -1 & (0) \end{pmatrix} \begin{pmatrix} b_1 \\ b_2 \\ b_3 \\ \vdots \end{pmatrix} = 0$$

A matrix $A_j$ formed from 0, 1 and −1 is integrated into the constraints. The index j refers to the property j. There is no looping in the sequence of equalities, in order to avoid redundancies which are sources of numerical instabilities and loss of rank in the constraint matrix. This means, for example, that there is no additional constraint of the type $b_3-b_1=0$ for the above three-base case.

There are at most n−1 rows, n being the number of bases. The new constraint is therefore expressed in the following manner:

$$A_j(\hat{B}_j^T+\delta^T)=0$$

Specifically since the estimates from the differential equation (1.1) are different, the corrections provided by δ make it possible to preserve the equalities over the course of time. The modified problem is then expressed as:

$$\min_{\delta} \frac{1}{2}\|\delta - \Delta\|^2$$

$$\delta u = 0, \quad A_j(\hat{B}_j^T + \delta^T) = 0$$

In the absence of new laboratory analyses $\overline{B}_j$, Δ is zero. Otherwise, it is equal to $\overline{B}_j-\hat{B}_j$. A diagonal weighting matrix W may optionally be added to the criterion.

The overall constraint matrix $$\begin{pmatrix} u^T \\ A_j \end{pmatrix}$$

is a full rank matrix since the first row is formed from terms that are all positive, whereas the other rows contain only a pair of 1 and −1. The linear application associated with this matrix is therefore surjective, which guarantees the existence of at least one feasible point. In addition, since the constraints form a convex set and the criterion is a convex function, there is unicity and existence of the solution.

This solution may be expressed explicitly by introducing the Lagrangian and applying the optimality conditions. The Lagrangian is written as:

$$L(\delta, \lambda, \mu) = \frac{1}{2}\|(\delta - \Delta)W\|^2 + \lambda \delta u + \mu^T A_j (\delta^T + \hat{B}_j^T)$$

Its derivatives are zero for the solution, and the following explicit expression for δ is obtained:

$$\lambda = \frac{u^T \Delta^T - u^T W^{-1} A_j^T (A_j W^{-1} A_j^T)^{-1} A_j (B_j^T + \Delta^T)}{u^T W^{-1} u - u^T W^{-1} A_j^T (A_j W^{-1} A_j^T)^{-1} A_j u}$$

$$\mu = (A_j W^{-1} A_j^T)^{-1} A_j [(B_j^T + \Delta^T) - \lambda W^{-1} u]$$

$$\delta = W^{-1}(W \Delta^T - \lambda u - A_j^T \mu)^T$$

Subexample 1.4.B: Total Order Relationship Management

For a given property, we consider for example a mixture having four bases ordered in the following order: $b_2 \leq b_3 \leq b_1 \leq b_4$. This may be expressed as:

$$b_2 \leq b_3 \leq b_1 \leq b_4 \Leftrightarrow \begin{cases} b_2 - b_3 \leq 0 \\ b_3 - b_1 \leq 0 \\ b_1 - b_4 \leq 0 \end{cases} \Leftrightarrow \begin{pmatrix} 0 & 1 & -1 & 0 \\ -1 & 0 & 1 & 0 \\ 1 & 0 & 0 & -1 \end{pmatrix} \begin{pmatrix} b_1 \\ b_2 \\ b_3 \\ b_4 \end{pmatrix} \leq 0$$

The problem to be solved is then the following:

$$\min_{\delta} \frac{1}{2}\|\delta - \Delta\|^2$$

$$\delta u = 0, \quad A_j(\hat{B}_j^T + \delta^T) \leq 0$$

Unlike the equality case, the matrix $A_j$ again contains n−1 rows and involves all the pairs of bases. The existence of a feasible point stems from the result of the equality case. This is because it is known that there exists a δ such that $$\begin{pmatrix} u^T \\ A_j \end{pmatrix} \delta = \begin{pmatrix} 0 \\ -A_j \hat{B}_j \end{pmatrix}.$$

The convexity gives the unicity of the solution. This problem does not have, however, an explicit solution and it requires recourse to a numerical optimization routine.

Subexample 1.4.C: Limit Management

To preserve physical scales with the estimates of the constituent properties calculated in line, new constraints may be used. The addition of limits on the estimated properties is performed in the space for searching for admissible δ values. The problem is then:

$$\min_{\delta} \frac{1}{2}\|\delta - \Delta\|^2$$

$$\delta u = 0, \quad B_j^{min} \leq \hat{B}_j + \delta \leq B_j^{max}$$

It will be recalled that the Farkas lemma is useful for demonstrating results concerning the existence of solutions to the various problems posed.

Farkas Lemma:

One and only one of the following two properties may be true:

there exists an x that satisfies Ax≤b, or there exists a v≥0 such that vA=0 and vb<0.

Using the Farkas lemma, it may be shown that the above problem always has a solution, provided that $\hat{B}_j u \in [B_j^{min}, B_j^{max}]$.

Subexample 1.4.D: Management of Equality Constraints and Limits

The problem is thus:

$$\min_{\delta} \frac{1}{2}\|\delta - \Delta\|^2$$

$$\text{s.t.} \begin{cases} \delta u = 0 \\ \text{sets of equalities} \\ \text{limits} \end{cases}$$

Using the Farkas lemma, it may be shown that the above problem always has a solution, provided that $\hat{B}_j u \in [B_j^{min}, B_j^{max}]$.

Subexample 1.4.E: Management of Limits and Total Order Relationships

The problem is expressed as follows:

$$\min_{\delta} \frac{1}{2}\|\delta - \Delta\|^2$$

$$\text{s.t.} \begin{cases} \delta u = 0 \\ A_j(\hat{B}_j + \delta)^T \leq 0 \\ B_j^{min} \leq \hat{B}_j + \delta \leq B_j^{max} \end{cases}$$

The matrix of the constraints is no longer surjective. The existence of at least one feasible point is therefore no longer acquired: the set of constraints may be unfeasible.

Using the Farkas lemma, it may be shown that the above problem always has a solution, provided that $\hat{B}_j u \in [B_j^{min}, B_j^{max}]$.

Subexample 1.4.F: Management of Limits and Partial Order Relationships

We consider n bases in total. The number of bases subjected to the order relationship is called m (<n) and it is assumed that they are the first m bases and are ordered in the increasing order of indices. This is always possible even if it means making permutations. This gives the following problem:

$$\min_{\delta} \frac{1}{2}\|\delta - \Delta\|^2$$

$$\text{s.t.} \begin{cases} \delta u = 0 \\ lb \leq \hat{b}_1 + \delta_1 \leq \ldots \leq \hat{b}_m + \delta_m \leq ub \\ lb \leq \hat{b}_{m+1} + \delta_{m+1} \leq ub \\ \vdots \\ lb \leq \hat{b}_n + \delta_n \leq ub \end{cases}$$

Using the Farkas lemma, it may be shown that the above problem always has a solution, provided that $\hat{B}_j u \in [B_j^{min}, B_j^{max}]$.

Subexample 1.4.G: Distribution Constraints

The general problem, enabling the various types of distribution constraints (equality, limits, order relationships between the estimates of the constituent properties), is expressed in the following manner:

$$\min_{\delta} \frac{1}{2}\|\delta - \Delta\|^2$$

$$\text{s.t.} \begin{cases} \delta u = 0 \\ \text{sets of equalities} \\ \text{partial order relationship} \\ \text{limits} \end{cases}$$

Using the Farkas lemma, it may be shown that the above problem always has a solution, provided that $\hat{B}_j u \in [B_j^{min}, B_j^{max}]$.

A practical illustration of this subexample is provided here, for a ten-base space. The recipe and the initial value of the following matrix $\hat{B}$ are given in Table 1.1:

TABLE 1.1

| Base | 1 | 2 | 3 | 4 | 5 |
|---|---|---|---|---|---|
| U | 0.0542 | 0.1124 | 0.0577 | 0.1385 | 0.1354 |
| $\hat{B}$ | 3 | −5 | 8 | 12 | 50 |

| Base | 6 | 7 | 8 | 9 | 10 |
|---|---|---|---|---|---|
| U | 0.0386 | 0.1203 | 0.1601 | 0.0835 | 0.0993 |
| $\hat{B}$ | 40 | 45 | 16 | 10 | 100 |

The following relationships are to be respected:

$$\begin{cases} lb \leq \hat{B}_1 \leq \hat{B}_3 = \hat{B}_4 \leq \hat{B}_8 \leq \hat{B}_9 \leq ub \\ lb \leq \hat{B}_5 = \hat{B}_6 = \hat{B}_7 \leq ub \\ lb \leq \hat{B}_2 \leq ub \\ lb \leq \hat{B}_{10} \leq ub \end{cases}$$

The limits are the following:

$lb = 0$ and $ub = 90$

It has been confirmed that $U'^* \hat{B} = 28.7783$ lies between the two limits.

The solution is calculated with a least-squares solution function. The results are given in Table 1.2:

TABLE 1.2

| Bases | Equal. | Inequal. | $B^{min}$ | $B^{max}$ | $\hat{B}$ | $\delta$ | $\hat{B} + \delta$ |
|---|---|---|---|---|---|---|---|
| 1 | — | 1 | 0 | 90 | 3 | 0.8771 | 3.8771 |
| 2 | — | — | 0 | 90 | −5 | 5.0000 | 0 |
| 3 | 1 | 2 | 0 | 90 | 8 | 3.5876 | 11.5876 |
| 4 | 1 | 2 | 0 | 90 | 12 | −0.4124 | 11.5876 |
| 5 | 2 | — | 0 | 90 | 50 | −3.4124 | 46.5876 |
| 6 | 2 | — | 0 | 90 | 40 | 6.5876 | 46.5876 |
| 7 | 2 | — | 0 | 90 | 45 | 1.5876 | 46.5876 |
| 8 | — | 3 | 0 | 90 | 16 | −1.0289 | 14.9711 |
| 9 | — | 4 | 0 | 90 | 10 | 4.9711 | 14.9711 |
| 10 | — | — | 0 | 90 | 100 | −10.0000 | 90.0000 |

The corrected estimate ($\hat{B} + \delta$) respects the applied constraints.

Subexample 1.4.H: Management of Flowing-Draining Tanks

The correction by a vector $\delta$ is used here to differentiate the estimated properties of the flowing-draining tanks from those of the isolated tanks. The properties of the isolated tanks do not vary over the course of mixing (provided that there is suitable homogenization), unlike those of the continuously fed tanks, which are liable to evolve over the course of mixing.

The problem is expressed in the following manner:

$$\min_{\delta} \frac{1}{2}\|\delta - \Delta\|^2$$

$$\delta u = 0$$

in which $$\Delta(i) = \overline{B}_j(i) - \hat{B}_j(i) = \begin{cases} 0 \\ B_0(i) - \hat{B}_j(i) \end{cases}$$

The flowing-draining tanks are left free and it is attempted to bring the estimates of the properties of the other tanks back to their laboratory analysis values.

Subexample 1.4.I: Particular Case of Constituents with Incorporation (Minimization/Maximization) Objectives It is advantageous to be able to apply the respect of a partial order relationship to the properties of the constituents associated moreover with a minimization or maximization tendency objective. The partial order of the estimates in question may be respected according to the order defined at the start by the initial quality values of constituents (generally provided by laboratory analysis).

Subexample 1.4.J: Particular Case of High or Low Saturation Estimates

The minimum and maximum limits used in the adaptation law and possibly in the calculation of the correction vector 6 are uncertain. For a given property, when all the estimates are saturated at the minimum or maximum limit, it may be reasonable to suspect an erroneous limit value. It is therefore useful to have a phase during which such situations are detected, in order subsequently to relax the values of the incriminated limits.

Detection

For a maximum limit, for example:

$$\forall i, \text{active base}, \hat{B}_j(i) = B_j^{max}$$

$$\Downarrow$$

$$\sum_{\text{active base}} \hat{B}_j(i)u_i = B_j^{max} \sum_{\text{active base}} u_i = B_j^{max}$$

It may be assumed here that the actual value of the property is greater than $B_j^{max}$. This situation may also be detected by noting that $B_j^{max} \leq y_j^{mes}$. Similarly, an incorrect minimum limit is detected by $B_j^{min} \geq y_j^{mes}$.

Relaxation

Should saturation be detected on the estimates, it is necessary to relax the limits. The new limit is defined in one of the following two ways:

TABLE 1.3

| minimum limit | maximum limit |
| --- | --- |
| $B_j^{min} = \min_{i \text{ active base}} (\hat{B}_j(i)) - \text{tol}$ | $B_j^{max} = \max_{i \text{ active base}} (\hat{B}_j(i)) + \text{tol}$ |
| $B_j^{min} = y_j^{mes} - \text{tol}$ | $B_j^{max} = y_j^{mes} + \text{tol}$ |

Example 1.5

Feedback with Averaged Control Values on Sporadic Measurements

The corrected matrix $\hat{B}$ may be determined using the following equation, which makes use of a historic average integrating past controls, in the case of a sporadic measurement not refreshed at each calculation period:

$$\frac{d\hat{B}_j^l}{dt} = -\beta_j H \frac{1}{\delta t} \int_{t-\delta t}^{t} u(\hat{B}_j u - y_j^{nies}) ds \quad (1.2)$$

The solution of this equation converges and satisfies $$\lim_{t \to +\infty} (\hat{B}_j u - y_j) = 0.$$

The following function is introduced:

$$\Psi(\hat{B}_j) = \frac{1}{2}(\hat{B}_j - B_j) H^{-1} (\hat{B}_j - B_j)^T$$

This function satisfies the following properties:

$$\Psi(B_j) = 0$$

$$\Psi(\hat{B}_j) < 0, \text{ for } \hat{B}_j \neq B_j$$

Its derivative is equal to:

$$\frac{d\Psi}{dt} = -\frac{\beta_j}{\delta t} (\hat{B}_j - B_j) \int_{t-\delta t}^{t} u(\hat{B}_j u - y_j^{mes}) dt$$

Given the choice of the length of interval, there are no new estimates calculated in the time interval [t−δt, t]. The following equation may then be written:

$$\frac{d\Psi}{dt} = -\frac{\beta_j}{\delta t} \int_{t-\delta t}^{t} u(\hat{B}_j u - y_j^{mes})^2 dt$$

The time derivative of the function $\Psi$ is negative. The function introduced is therefore clearly a Lyapunov function for the system. The solution therefore converges towards the Lasalle set, thereby demonstrating the stated result.

In the case of sporadic measurements, it may be advantageous to calculate a new estimate only when a new measurement is available, and not systematically at each iteration. Moreover, it is possible to average the command around the moment when the specimen is taken and measured. This average calculation enables the effects of any inaccuracies in the measurement delay to be limited. The following implementation is proposed:

$$\frac{d\hat{B}_j}{dt} = -\frac{\beta_j}{\delta t} H \int_{t-\Delta-\frac{\delta t}{2}}^{t-\Delta+\frac{\delta t}{2}} u(s)(\hat{B}_j u(s) - y_j^{nies}) ds \quad (1.3)$$

in which $\Delta$ is the measurement delay associated with the property j.

Parameter Setting and Implementation

It is necessary to choose the length of the sliding window, which must depend on the delay. The following parameter setting is proposed on the basis of dating errors of around 20%:

$$\delta t = \frac{\Delta}{5}.$$

Example 2.1

Feedback with Premixing, Control in Instantaneous Mode

This example is similar to example 1.1, but corresponds to the case in which certain bases are premixed before they are mixed with other bases to form the desired mixture.

Figure 2:
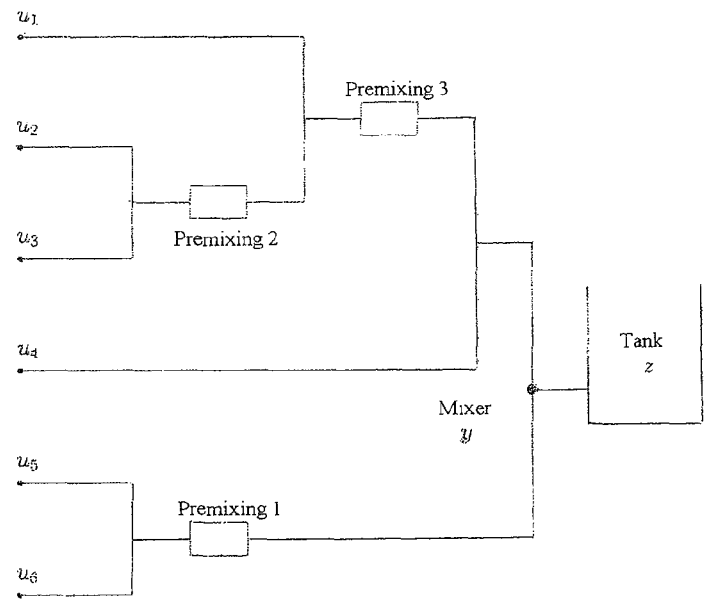
FIG. 2 is an example of the topography of a six-base mixture, comprising three premixes.

FIG. 2 shows an example of a six-base mixing topography.

Consider a plant comprising p premixing operations denoted by 1 to p. Let:

$Q_i(t)$ be the volume flow rate of the base i at time t, with i $\in \{1, \ldots n\}$;

$Q_{n+i}(t)$ be the total volume flow rate passing through the dead volume associated with the premixing operation i at time t, with $i \in \{1, \ldots p\}$ (the incoming flow rate is always equal to the outgoing flow rate);

$Q(t)$ be the total volume flow rate through the mixer at time t, $$Q(t) = \sum_{i=1}^{n} Q_i(t),$$

$V_i$ be the dead volume associated with the premixing operation i; and $b_i$ be the vector of the properties of the base i, $b_j^E(t)$ (and $b_j^S(t)$ respectively) be the vector of the properties upon entering (and exiting respectively) the premixing operation j at time t. By convention, for a base $b_i$: $b_j^{E(i)} = b_j^S(t)$.

Let a path $\Pi_i$ be associated with each base i, said path being defined by the series of $p_i$ dead volumes through which this base passes in order to reach the mixer. This path is a series of different integers $p_i$ which relate to the numbering indices for the premixing operations, $\Pi_i = \{\pi_i^1, \pi_i^2, \ldots, \pi_i^{p_i}\}$, with $\pi_i^j \in \{1, \ldots, p\}$ for any $j \in \{1, \ldots, p_i\}$. $\Pi_i = \emptyset$, $p_i = 0$, means that the base i is injected directly into the mixer.

In the case of FIG. 2, we have:

$\Pi_1 = \{3\}, p_1 = 1,$ $\Pi_2 = \{2,3\}, p_2 = 2$ $\Pi_3 = \{2;3\}, p_3 = 2$ $\Pi_4 = \emptyset, p_4 = 0$ $\Pi_5 = \{1\}, p_5 = 1$ $\Pi_6 = \{1\}, p_6 = 1.$ For any premixing operation i, we define the set $\Gamma_i$ of its $q_i$ incoming flow rates. This is a set of $q_i$ different integers which relate to the indices for numbering the volume flow rates, $\Gamma_i = \{\gamma_i^1, \gamma_i^2, \ldots, \gamma_i^{q_i}\}$, with $\gamma_i^j \in \{1, \ldots, n+p\}$, for any $j \in \{1, \ldots, q_i\}$.

In the case of FIG. 2, we have:

$\Gamma_1 = \{5,6\}, q_1 = 2$ $\Gamma_2 = \{2,3\}, q_2 = 2$ $\Gamma_3\{1,6+3\} = \{1,9\}, q_3 = 2.$ For $\Pi_i = \emptyset$, the properties $b_i$ are involved in the weighted form $Q_i(t)/Q(t)b$, in the expression for the properties of the mixture in the form of a linear combination of the properties of the bases.

Let us now turn to the case $\Pi_i \neq \emptyset$.

For the premixing operation $\pi_i^j$, the total flow rate is $$Q_{\pi_i^j}(t) = \sum_{k \in \Gamma_{\pi_i^j}} Q_k(t).$$

The input property $b_{\pi_i}^E(t)$ is given by:

$$b_{\pi_i^1}^E(t) = \frac{\sum_{j \in \Gamma_{\pi_i^1}} b_j^E Q_j(t)}{\sum_{j \in \Gamma_{\pi_i^1}} Q_j(t)}.$$

In this input, the term in $b_i$ occurs in the form:

$$\frac{Q_i(t)}{\sum_{j \in \Gamma_{\pi_i^1}} Q_j(t)} b_i = \frac{Q_i(t)}{Q_{\pi_i^1}(t)} b_i.$$

As output, we have $b_{\pi_i^1}^S(t) = b_{\pi_i^1}^E(t - \delta_{\pi_i^1}(t))$, the pure delay $\delta_{\pi_i^1}(t)$ being defined by:

$$V_{\pi_i^1} = \int_{t - \delta_{\pi_i^1}(t)}^{t} Q_{\pi_i^1}(\tau) d\tau. \qquad (3)$$

The term in $b_i$ therefore occurs in $b_{\pi_i^1}^S(t)$ in the form:

$$\frac{Q_i(t - \delta_{\pi_i^1}(t))}{Q_{\pi_i^1}(t - \delta_{\pi_i^1}(t))} b_i.$$

Similarly, we have, for the premixing operation $\pi_i^2$:

$$b_{\pi_i^2}^E(t) = \frac{\sum_{j \in \Gamma_{\pi_i^2}} b_j^E Q_j(t)}{\sum_{j \in \Gamma_{\pi_i^2}} Q_j(t)},$$

i.e., for the term in $b_i$ in $b_{\pi_i^2}^S(t)$ $$\frac{Q_{\pi_i^1}(t)}{Q_{\pi_i^2}(t)} \frac{Q_i(t - \delta_{\pi_i^1}(t))}{Q_{\pi_i^1}(t - \delta_{\pi_i^1}(t))} b_i.$$

For $b_{\pi_i^2}^S(t) = b_{\pi_i^2}^E(t - \delta_{\pi_i^2}(t))$ the term in $b_i$ occurs in the form:

$$\frac{Q_{\pi_i^1}(t - \delta_{\pi_i^2}(t))}{Q_{\pi_i^2}(t - \delta_{\pi_i^2}(t))} \frac{Q_i(t - \delta_{\pi_i^2}(t) - \delta_{\pi_i^1}(t - \delta_{\pi_i^2}(t)))}{Q_{\pi_i^1}(t - \delta_{\pi_i^2}(t) - \delta_{\pi_i^1}(t - \delta_{\pi_i^2}(t)))} b_i.$$

We see compositions of delays in the paths $\Pi_i$ appear. Let us define the functions: $\Delta_i^j(t): t \mapsto t - \delta_{\pi_i^j}(t)$, for any $\pi_i^j$ in $\Pi_i$, the composition of these functions at fixed j is defined by:

$$\Delta_i^{k,j}(t) \triangleq \Delta_i^k(\Delta_i^j(t)): t \mapsto t - \delta_{\pi_i^j}(t - \delta_{\pi_i^k}(t - \delta_{\pi_i^j}(t)))$$

and $$\Delta_i^{l,k,j}(t) \triangleq \Delta_i^l(\Delta_i^{k,j}(t)).$$

With these definitions, the formula for the term $b_i$ in $b_{\pi_i^2}^S(t)$ is given by:

$$\frac{Q_{\pi_i^1}(\Delta_i^2(t))}{Q_{\pi_i^2}(\Delta_i^2(t))} \frac{Q_i(\Delta_i^{1,2}(t))}{Q_{\pi_i^1}(\Delta_i^{1,2}(t))} b_i.$$

On leaving the final premixing operation $\pi_i^{p_i}$, we have, for $b_{\pi_i^{p_i}}^S(t)$ in $b_i$:

$$\frac{Q_{\pi_i^{p_i-1}}(\Delta_i^{p_i}(t))}{Q_{\pi_i^{p_i}}(\Delta_i^{p_i}(t))} \frac{Q_{\pi_i^{p_i-2}}(\Delta_i^{p_i-1,p_i}(t))}{Q_{\pi_i^{p_i-1}}(\Delta_i^{p_i-1,p_i}(t))} \cdots \frac{Q_{\pi_i^1}(\Delta_i^{2,\cdots,p_i}(t))}{Q_{\pi_i^2}(\Delta_i^{2,\cdots,p_i}(t))} \frac{Q_i(\Delta_i^{1,2,\cdots,p_i}(t))}{Q_{\pi_i^1}(\Delta_i^{1,2,\cdots,p_i}(t))}$$

and, finally, in the mixture, denoting by $U_i(t)$ the $b_i$ factor term:

$$U_i(t) = \frac{Q_{\pi_i^{p_i}}(t)}{Q(t)} \frac{Q_{\pi_i^{p_i-1}}(\Delta_i^{p_i}(t))}{Q_{\pi_i^{p_i}}(\Delta_i^{p_i}(t))} \tag{4}$$

$$\frac{Q_{\pi_i^{p_i-2}}(\Delta_i^{p_i-1,p_i}(t))}{Q_{\pi_i^{p_i-1}}(\Delta_i^{p_i-1,p_i}(t))} \cdots \frac{Q_{\pi_i^1}(\Delta_i^{2,\cdots,p_i}(t))}{Q_{\pi_i^2}(\Delta_i^{2,\cdots,p_i}(t))} \frac{Q_i(\Delta_i^{1,2,\cdots,p_i}(t))}{Q_{\pi_i^1}(\Delta_i^{1,2,\cdots,p_i}(t))}.$$

Hence $U_i(t) = u_i(t) = Q_i(t)/Q(t)$ for $\Pi_i \neq \emptyset$, and the output is expressed as:

$$y(t) = \sum_{i=1}^{n} U_i(t) b_i \tag{5}$$

Thus, for the premixed cases, equation (1) of the dynamic system becomes:

$$\frac{d\hat{B}_j^t}{dt} = -\beta_j H U(t)(y_j(t) - y_j^{mes}(t)), \tag{2}$$

with $U(t) = (U_1(t), \ldots, U_n(t))^t$, the $U_i(t)$ values being defined by equation (4) and $y(t) = y_1(t), \ldots, y_m(t))^t$ by equation (5).

The function used in the case without premixing remains a Lyapunov function for this new dynamic and demonstrates the convergence of $\hat{B}U$ towards $BU$.

Example 2.2

Feedback with Premixing

Example of Formalization and Implementation

This example is similar to example 2.1, but corresponds to a particular generic solution for the formalization and implementation of the topology with multiple premixes upstream of the mixer.

The notation dV will be used for a premixing delay associated with a premix volume V.

A. Multiple Premix Topology Matrix

A matrix describing the generic topology is used here to define the dead volumes associated with a maximum vector comprising n bases for a maximum series of k premixing stages as possible series, knowing that, for a given stage, several premixing operations in parallel may be defined.

The maximum dimensions of the topology matrix (n bases and k stages) are configuration-modifiable parameters.

Each row of the matrix corresponds to a given constituent base.

Each column of this matrix comprises the descriptive of a premixing stage, with the dead volumes associated with the bases of constituents participating in the premixing in question, or associated with the groupings of premixed bases, resulting from previous stage premixing.

An example of an actual topology comprises here 3 premixing stages described as follows:

TABLE 1.4

Multiple-premixing topology matrix

| Base | Stage 1 | Stage 2 | Stage 3 | Tank |
|------|---------|---------|---------|------|
| 1    | V1      | V1'     | V1"     | B1   |
| 2    | V1      | V1'     | V1"     | B2   |
| 3    | 0       | 0       |         |      |
| 4    | 0       | 0       | V2"     | B4   |
| 5    | 0       | 0       | V2"     | B5   |
| 6    | V2      | V1'     | V1"     | B6   |
| 7    | V2      | V1'     | V1"     | B7   |
| 8    | 0       | 0       | 0       |      |
| 9    | 0       | 0       |         |      |
| 10   | 0       | 0       | V1"     | B10  |
| 11   | 0       | 0       | 0       |      |

This matrix describing the multiple-premixing topology is used to identify the premixing operations in series (over several different stages) and in parallel (over a given premixing stage), the bases in question and the associated dead volumes.

This formulation has the advantage of being compact, complete, clear and generic.

Depending on the current recipe (with such or such a tank, for cases in which a switch is made to a back-up tank, etc.), the premixing topology considered will be automatically adapted, taking the recipe into account.

Figure 11:
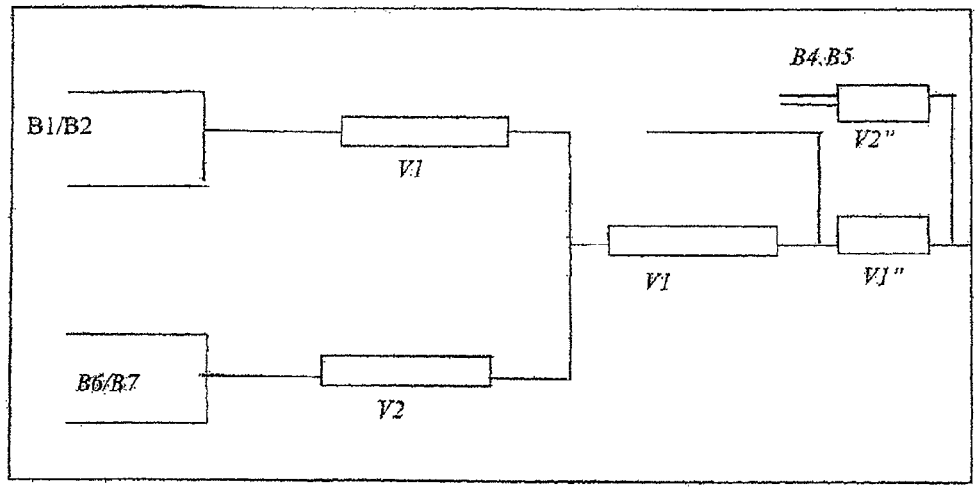
FIGS. 11 and 12 represent examples of topologies used in Example 2.1.

The example of the matrix provided above is an illustration of the topology represented in FIG. 11.

The first stage comprises two premixing operations in parallel associated with dead volumes V1 and V2.

The second stage comprises a single premixing operation associated with a dead volume V'.

The third stage comprises two premixing operations in parallel associated with respective dead volumes V1" and V2".

This topology matrix is therefore read from left to right.

For a given row (a given constituent i) and for a given stage (column k):

if all the elements in row i with index<k (left-hand part of the row) are zero, then the base in question does not participate in any premixing on the preceding stages;

if one of the elements in row i with index<k (left-hand part of the row) is non-zero, then the base in question participates in premixing on the preceding stages, and it is then associated with a premixing delay associated with a dead volume corresponding to the non-zero value of the element in question.

In this case, it is necessary to return to the set of constituent bases associated with the same dead volume, for the stage in question (in the column in question of the matrix): this subset of constituents belonging to the same premixing operation is a group of premixed bases entering the stage in question.

The sole restriction of this matrix description is the following: for this description, it is not possible to have two different premixes, in parallel (in the same stage), associated with the same dead volume value. In this case, there is no means of differentiating the bases participating in each of the two premixing operations: they are grouped together in one and the same premixing operation.

B. Single Premixing

1. Without premixing, the linear volume model used, after index transformation of the constituent properties, gives the value of the property j of the mixture as:

$$y_j(t) = \sum_i bi * ui(t)$$

this equation making it possible to calculate a prediction of the mixing quality $y_j$ from a matrix of the qualities of the constituents B (row vector component bi for a property j) and a control vector U (component ui, which is dependent on time t).

2. For a single premixing operation, this equation becomes, for the premixing delay dV, the following general formula denoted [2.2B2]:

$$y(t) = \sum_{i \in PM} bi*ui(t-dV)*\left(\sum_{j \in PM} uj(t)\right) \bigg/ \left(\sum_{j \in PM} uj(t-dV)\right) + \sum_{i \notin PM} biui(t)$$

PM is the subset of the indices of the constituents belonging to the premixing operation.

The constituents not belonging to the premixing operation are incorporated directly into the mixer.

Figure 12:
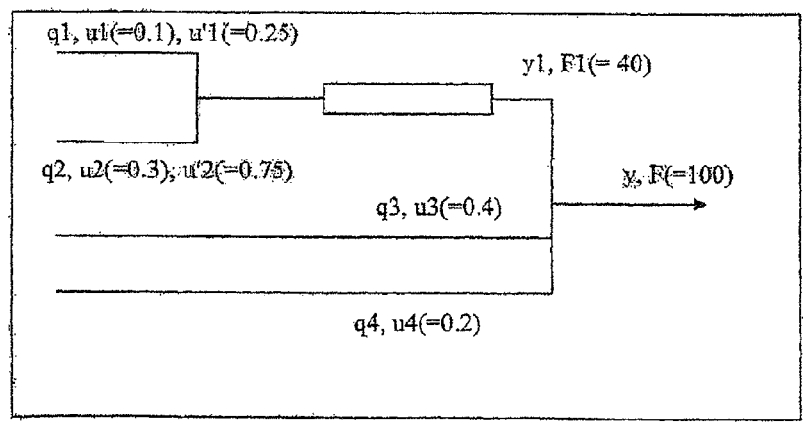

Let us consider the following example, with premixed bases 1 and 2 and non-premixed bases 3 and 4, the topology of which is shown in FIG. 12.

The total flow rate F(t) leaving the mixer is the sum of the partial flow rates of the upstream channels Fi(t) corresponding to the ratios ui(t).

The constituents i of the premixing operation are associated with ratios u'i, corresponding to the partial flow rates of the premixed channels divided by the total flow rate of the premixed channels, here Fl(t).

This total flow rate of the premixed channels is relative to a premixing product characterized by a property value y1(t).

The mixer output product is characterized by a property value y.

The incoming constituents i have a property value qi and dV is the delay of the premixing operation.

The quality y(t) of the product at time t is given by:

$$y(t)=(F1(t)/F(t))y1(t)+q3*u3+q4*u4$$

There is also the following equation:

$$y1(t)=u'1(t-d)q1+u'2(t-dV)q2.$$

Moreover, $F1(t)=(u1(t)+u2(t))F(t)$ and $u'i(t) F1(t)=ui(t) F(t)$, i=1 or 2.

Therefore, $u'i(t-dV)=ui(t-dV)/(u1(t-dV)+u2(t-dV))$.

Finally, $$y(t)=q1*u1(t-dV)(u1(t)+u2(t))/(u1(t-dV)+u2(t-dV))+$$
$$q2*u2(t-dV)(u1(t)+u2(t))/(u1(t-dV)+u2(t-dV))+$$
$$q3*u3+q4*u4$$

This is an expression corresponding to the general formula [2.2B2] for a single premixing operation.

C. Multiple Premixing Operations in Parallel

For several premixing operations in parallel on a single stage, the above equation becomes:

$$y(t) = \sum_{k \in PM(e)} \left( \frac{\sum_{i \in PM(e,k)} bi*ui(t-dV(k,e))*\left(\sum_{j \in PM(e,k)} uj(t)\right)}{\left(\sum_{j \in PM(e,k)} uj(t-dV(k,e))\right)} + \sum_{i \notin PM(e,k)} biui(t) \right) + \sum_{i \notin PM(e,k) \forall k PM(e))} biui(t)$$

It is assumed that a given base does not participate in two different premixing operations in parallel at the same level: there is therefore a juxtaposition of terms relating to the premixed bases for the various successive premixing operations.

PM(e) is the set of indices k of premixing operations in parallel for the stage e in question.

PM(e,k) is the set of indices k' (denoted by i or j in the sums) of the bases belonging to the premixing operation k of the current stage e.

dV=dV(k,e) is the delay of the current premixing operation k for the stage e in question.

D. Multiple Premixing Operations in Series and in Parallel

For several premixing operations in series and in parallel, the procedure adopted is progressive, stage by stage, starting with the starting bases associated with the non-delayed current control vector, calculating a delayed control vector at the output of each stage and propagating this vector onto the next stage.

The delayed control vector at the output of the last stage will be the delayed control vector that will be used to synchronize the control operations in the property estimation equation.

For our example described in Table 1.4, the bases not participating in any premixing in the first stage are the bases 3, 4, 5, 8, 9 and 10.

The contribution for these bases is the following:

$$\sum_{i \notin PM(k) \forall k \in PM(1)} biui(t) =$$
$$b3u3(t) + b4u4(t) + b5u5(t) + b8u8(t) + b9u9(t) + b10u10(t)$$

The bases participating in the premixing operation premixV1 are: u1 and u2.

The bases participating in the premixing operation premixV2 are: u6 and u7.

The contribution for these bases is the following:

$$\sum_{i \in premixV1} bi*ui(t-dV1)*\frac{\left(\sum_{j \in premixV1} uj(t)\right)}{\left(\sum_{j \in premixV1} uj(t-dV1)\right)} +$$

$$\sum_{i \in premixV2} bi*ui(t-dV2)*\frac{\left(\sum_{j \in premixV2} uj(t)\right)}{\left(\sum_{j \in premixV2} uj(t-dV2)\right)}$$

For this first stage, the premixing delays δV1 and δV2 are associated respectively with the dead volumes V1 and V2 of the two premixing operations to be considered on the bases 1, 2 and on the bases 6, 7 respectively.

The delayed control vector VR(t) that it is desired to calculate will have the following form:

$$y_j(t) = \sum_i bi * VRi(t)$$

The delayed control vector at the output of stage 1 will then be expressed in the following manner:

This delayed control vector for stage 1 is denoted by VR1.

The components of this vector, associated with the bases that do not participate in any premixing operation, will be the corresponding components of the unchanged current control vector: VR1$i$(t)=ui(t).

In contrast, the components of this vector that are associated with the bases which do participate in a premixing operation "premix" with a delay dV will undergo a synchronization treatment of the type:

$$VR1i(t) = ui(t - dV) * \frac{\left(\sum_{j \in premix} uj(t)\right)}{\sum_{j \in premix} uj(t - dV))}$$

The calculation of VR1 uses the current control vector u(t).

For the example in Table 1.4, VR1 will therefore be defined by:

1  u1($t$-dV1)*[U1+U2($t$)]/[U1+U2($t$-dV1)]
2  u2($t$-dV1)*[U1+U2($t$)]/[U1+U2($t$-dV1)]
3  u3($t$)
4  u4($t$)
5  u5($t$)
6  u6($t$-dV2)*[U6+U7($t$)]/[U6+U7($t$-dV2)]
7  u7($t$-dV2)*[U6+U7($t$)]/[U6+U7($t$-dV2)]
8  u8($t$)
9  u9($t$)
10 u10($t$)

The calculated delayed control vector for stage 2 (denoted by VR2) will use, at the stage input, as current control, the delayed control vector at the output of the preceding stage (denoted by VR1, having component VR1$i$=VR1($i$)).

This second stage is defined by a premixing operation associated with a dead volume V1' and a corresponding delay dV1' for the bases 1, 2, 6 and 7.

VR2 will therefore be defined by the following components:

1  VR11($t$-dV1')*[VR11+VR12($t$)+VR16+VR17($t$)]/[VR11+VR12+VR16+VR17($t$-dV1')]
2  VR12($t$-dV1')*[VR11+VR12($t$)+VR16+VR17($t$)]/[VR11+VR12+VR16+VR17($t$-dV1')]
3  VR13($t$)
4  VR14($t$)
5  VR15($t$)
6  VR16($t$-dV1')*[VR11+VR12($t$)+VR16+VR17($t$)]/[VR11+VR12+VR16+VR17($t$-dV1')]
7  VR17($t$-dV1')*[VR11+VR12($t$)+VR16+VR17($t$)]/[VR11+VR12+VR16+VR17($t$-dV1')]
8  VR18($t$)
9  VR19($t$)
10 VR110($t$)

The delayed control vector calculated for stage 3 (denoted by VR3) will use, at the stage input, as current control, the delayed control vector at the preceding stage output (denoted by VR2, having component VR2$i$=VR2($i$)).

This third stage is defined by a premixing operation with a delay dV1" associated with a dead volume V1" for the bases 1, 2, 6, 7 and 10 on the one hand and a second premixing operation with a delay dV2" associated with a dead volume V2" for the bases 4, 5 on the other.

VR3 will therefore be defined by:

1  VR21($t$-dV1")*[VR21+VR22+VR26+VR27+VR210($t$)]/[VR21+VR22+VR26+VR27+VR210($t$-dV1")]
2  VR22($t$-dV1")*[VR21+VR22+VR26+VR27+VR210($t$)]/[VR21+VR22+VR26+VR27+VR210($t$-dV1")]
3  VR23($t$)
4  VR24($t$-dV2")*[VR24+VR25($t$)]/[VR24+VR25($t$-dV2")]
5  VR25($t$-dV2")*[VR24+VR25($t$)]/[VR24+VR25($t$-dV2")]
6  VR26($t$-dV1")*[VR21+VR22+VR26+VR27+VR210($t$)]/[VR21+VR22+VR26+VR27+VR210($t$-dV1")]
7  VR27($t$-dV1")*[VR21+VR22+VR26+VR27+VR210($t$)]/[VR21+VR22+VR26+VR27+VR210($t$-dV1")]
8  VR28($t$)
9  VR29($t$)
10 VR210($t$-dV1")*[VR21+VR22+VR26+VR27+VR210($t$)]/[VR21+VR22+VR26+VR27+VR210($t$-dV1")]

For this three-stage topology, the final delayed vector then used in the adaptation law of the matrix B of constituents will be that calculated at the output of stage 3, that is to say VR3 defined above.

E. General Recursive Formulation of the Delayed Control

At the output of stage k, a recursive formula for the delayed control vector of the form $VR_k = f(VR_{k-1})$ is obtained with:

$VR_k$, the delayed vector at the output of stage k;

$VR_{k-1}$, the delayed vector at the output of stage k−1.

$VR_k$ will therefore be defined by:

$$\begin{bmatrix} VR_{(k-1)}i(t - dV(k, p_k)) * \\ \dfrac{\left(\sum_{j \in PM(k,p_k)} VR_{(k-1)}j(t)\right)}{\sum_{j \in PM(k,p_k)} VR_{(k-1)}j(t - dV(k, p_k)))} \\ \text{if } i \in PM(k, p_k) \\ VR_{(k-1)}i(t) \\ \text{if } i \notin PM(k, p_k) \forall\, p_k \in Pk \end{bmatrix}$$

In the above, $dV(k, p_k)$ is the premixing delay for the premixing operation $p_k$, among the Pk premixing operations of stage k, with a total of K stages to be considered for the topology to be treated.

$PM(k, p_k)$ is the subset of bases of the premixing operation $p_k$ of stage k.

F. Implicit Use of the Variable Delay

The variable delay: $dV(k, p_k)$ is calculated from the dead volume associated with the premixing operation $p_k$ of the stage k and from the flow rate.

For variable delay management, an implicit formula for obtaining, by interpolation, the delayed control value (and not the delay) associated with a given dead volume at the horizon may be advantageously used here.

The recursive expression of the delayed control for cascades of series/parallel premixing operations means that this variable delay is a composition of delays associated with the dead volumes of the various premixing operations of the "prior" stages, taking into account the defined topology.

G. Equivalent Topologies

The topology proposed here with premixing operation V2″ at stage 3 is equivalent if this premixing operation is shifted to stage 1 (V3) or to stage 2 (V2′):

TABLE 1.5

Matrix with V2″:

| Base | Stage 1 | Stage 2 | Stage 3 | Tank |
|---|---|---|---|---|
| 1 | V1 | V1′ | V1″ | B1 |
| 2 | V1 | V1′ | V1″ | B2 |
| 3 | 0 | 0 |  |  |
| 4 | 0 | 0 | V2″ | B3 |
| 5 | 0 | 0 | V2″ | B4 |
| 6 | V2 | V1′ | V1″ | B5 |
| 7 | V2 | V1′ | V1″ | B6 |
| 8 | 0 | 0 | 0 |  |
| 9 | 0 | 0 | 0 |  |
| 10 | 0 | 0 | V1″ | B7 |
| 11 | 0 | 0 | 0 |  |

Equivalent Matrix with V3 (=V2″):
The actual topology comprises three premixing stages:

TABLE 1.6

| Base | Stage 1 | Stage 2 | Stage 3 | Tank |
|---|---|---|---|---|
| 1 | V1 | V1′ | V1″ | B1 |
| 2 | V1 | V1′ | V1″ | B2 |
| 3 | 0 | 0 |  |  |
| 4 | V3 | 0 | 0 | B4 |
| 5 | V3 | 0 | 0 | B5 |
| 6 | V2 | V1′ | V1″ | B6 |
| 7 | V2 | V1′ | V1″ | B7 |
| 8 | 0 | 0 | 0 |  |
| 9 | 0 | 0 | 0 |  |
| 10 | 0 | 0 | V1″ | B10 |
| 11 | 0 | 0 | 0 |  |

Equivalent Matrix with V2′ (=V3=V2″):
The actual topology comprises three premixing stages:

TABLE 1.7

| Base | Stage 1 | Stage 2 | Stage 3 | Tank |
|---|---|---|---|---|
| 1 | V1 | V1′ | V1″ | B1 |
| 2 | V1 | V1′ | V1″ | B2 |
| 3 | 0 | 0 |  |  |
| 4 | 0 | V2′ | 0 | B4 |
| 5 | 0 | V2′ | 0 | B5 |
| 6 | V2 | V1′ | V1″ | B6 |
| 7 | V2 | V1′ | V1″ | B7 |
| 8 | 0 | 0 | 0 |  |
| 9 | 0 | 0 | 0 |  |
| 10 | 0 | 0 | V1″ | B10 |
| 11 | 0 | 0 | 0 |  |

Example 3

Optimization Sequences

The control method according to the invention uses an optimization procedure to determine the recipe u during substep (3) of step (ii). This optimization procedure comprises the abovementioned steps (a) to (d). The optimization procedure is implemented by the optimizer 14 and delivers an optimized recipe u to the estimator 13 in order to determine the recipe to be applied to the control means 10 of the system.

An example of the operation of the optimization procedure used to optimize the recipe u will be described below with reference to FIG. 3.

Notations:

We consider the following subsets of $M=\{1, 2, \ldots, m\}$, the set of indices assigned to the outputs:

R, the subset of output indices for which references calculated in integrated mode or setpoints in instantaneous mode are specified;

$H_m$, the subset of output indices for which minimum limits called "hard" limits, that is to say limits that must as a priority be respected, are specified;

$H_M$, the subset of output indices for which hard maximum limits are specified;

$S_m$, the subset of output indices for which minimum limits called "soft" limits, that is to say non-priority limits, are specified; and $S_M$, the subset of output indices for which soft maximum limits are specified.

What are assumed to be able to be associated with each output are at most a reference (or setpoint), a minimum (hard or soft) limit and a maximum (hard or soft) limit. Implicitly therefore, $H_m \cap S_m = \emptyset$ and $H_M \cap S_M = \emptyset$.

Moreover, the estimated effects of the additives are assumed to be taken into account in the value of the references and of the constraints.

The equalities that have to be taken into account in respect of the references $y_i^{ref}$ are:

$$y = y_i^{ref}, \forall i \in R.$$

Let $\hat{B}_R$ be the matrix extracted from $\hat{B}$ by keeping only the rows that correspond to the indices belonging to R. By introducing the vectors $y_R$ and $y_R^{ref}$, this set of inequalities is rewritten as $y_R = \hat{B}_R u = y_R^{ref}$. This is a constraint on the unknown u.

The set of constraints on the outputs are given by:

$$\begin{cases} y_i \geq y_i^{min} & \forall i \in H_m \\ y_i \leq y_i^{max} & \forall i \in H_M \\ y_i \geq y_i^{min} & \forall i \in S_m \\ y_i \leq y_i^{max} & \forall i \in S_M \end{cases}$$

Let $\hat{B}_{H_m}$ be the matrix extracted from $\hat{B}$ by keeping only the rows relating to the indices belonging to $H_m$. By introducing the vectors $y_{H_m}$ and $y_{H_m}^{min}$, the first set of inequalities is rewritten as $y_{H_m} = \hat{B}_{H_m} u \geq y_{H_m}^{min}$. This is a constraint on the unknown u. Via similar notations, $$\begin{cases} \hat{B}_{H_m} u \geq y_{H_m}^{min} \\ \hat{B}_{H_M} u \leq y_{H_M}^{max} \\ \hat{B}_{S_m} u \geq y_{S_m}^{min} \\ \hat{B}_{S_M} u \leq y_{S_M}^{max} \end{cases}$$

this set of inequalities is of course equivalent to $$\begin{cases} -\hat{B}_{H_m} u \leq -y_{H_m}^{min} \\ \hat{B}_{H_M} u \leq y_{H_M}^{max} \\ -\hat{B}_{S_m} u \leq -y_{S_m}^{min} \\ \hat{B}_{S_M} u \leq y_{S_M}^{max} \end{cases}$$

Let:

$$B_H = \begin{pmatrix} -B_{H_m} \\ B_{H_M} \end{pmatrix}$$

$$B_S = \begin{pmatrix} -B_{S_m} \\ B_{S_M} \end{pmatrix}$$

$$y_H^{max} = \begin{pmatrix} -y_{H_m}^{min} \\ y_{H_M}^{max} \end{pmatrix}$$

$$y_S^{max} = \begin{pmatrix} -y_{S_m}^{min} \\ y_{S_M}^{max} \end{pmatrix}.$$

The set of inequalities is finally given by:

$$\begin{cases} B_H u \leq y_H^{max} \\ B_S u \leq y_S^{max} \end{cases}$$

Consequently, in accordance with the abovementioned notations, the notations $y_p = \hat{B}_p u \leq y_p^{Max}$ are used for any set P of indices associated with these outputs. For a single output of index j, the notation is simply $y_j = \hat{B}_j u$.

The initial optimization problem P0 (complete problem) consists in finding the recipe u closest to a reference recipe $\bar{u}$, while still meeting the set of constraints on u. This problem does not necessarily have a solution. If it does not have a solution, it is necessary nevertheless to produce a new recipe, which is obtained according to the invention by sequentially solving several successive optimization problems:
  firstly (problem P1), the admissible values for the hard constraints on the outputs are sought, by proceeding iteratively from the highest-priority hard constraints towards the lowest-priority hard constraints;
  secondly (problem P2), the admissible values for the references are sought; and
  finally (problem P3), the admissible values for the soft constraints on the outputs are sought, by proceeding iteratively from the highest-priority soft constraints towards the lowest-priority soft constraints.

Table 1 describes an example of the optimization sequences.

TABLE 1 optimization sequences P0 to P3

|  |  | P0 | P1 | P2 | P3 |
|---|---|---|---|---|---|
| Recipe optimization |  | criterion |  |  |  |
| Min/Max analyser | Soft | constraint |  |  | criterion |
|  | Hard | constraint | criterion | achievable constraint | achievable constraint |
| Analyser setpoints |  | constraint |  | criterion | achievable reference |
| Rate/Min/Max Bases |  | constraint | constraint | constraint | constraint |
| Channel sum = 100% |  | constraint | constraint | constraint | constraint |

The minima/maxima of the bases used as permanent priority constraints are with respect to values in proportions, knowing that the hydraulic minima/maxima are expressed in m³/h, using the total output of the mixer.

The rates of change (ROCs) are typically around 25%.

To produce a petrol-type mixture, the hard minima are typically the density, the octane number and the percentage distilled, while the hard maxima are typically the sulphur content, the density, the vapour pressure, the volatility, the benzene content, the content of olefins and the content of aromatics. And conversely for the soft minima and maxima, except for the density, which has its minimum and maximum thresholds as hard thresholds.

To produce a gasoil-type mixture, the soft minima are typically the sulphur content, the density, the filterability and the cloud point, while the soft maxima are typically the flash point, the cetane number and the percentage distilled. And conversely for the hard minima and maxima.

To produce a mixture of the fuel oil type, the hard minima are typically the viscosity and the hard maxima are typically the viscosity, the sulphur content and the density.

The various successive problems explained in detail below may be used.

Initial Problem P0

The initial problem P0 is used in implementing step (a) of the optimization procedure described above. The solution of this complete regulation problem P0 consists of an optimized recipe u taking into account the constraints on the proportions of the constituents and the constraints on the properties of the mixture.

This problem consists in meeting the set of constraints on the recipe and on the outputs, and also the references on the outputs, while being the least possible distance away from the reference recipe, in the least-squares sense.

The problem to be solved is thus:

$$\min_u \|u - \bar{u}\|^2$$

$$\begin{cases} u^{min} \leq u \leq u^{max} \\ \sum_{i=1}^n u_i = 1 \\ \hat{B}_R u = y_R^{ref} \\ \hat{B}_H u \leq y_H^{max} \\ \hat{B}_S u \leq y_S^{max} \end{cases}$$

The optimization problem formulated here, as optimization variable, a recipe vector u that it is desired to calculate.

An alternative consists in posing a similar optimization problem with, as optimization variable, a deviation vector e for the deviation between the initial reference recipe and the recipe u of the proportions of the constituents.

When this problem has a solution u*, it is applied. If this is not the case, the three problems P1 to P3 described below are solved in succession.

For this problem P0, the constraints to be met are:
(1) constraints on the proportions of the bases:
hydraulic constraints (inequalities): each channel i may deliver a flow rate between $F_i^{min}$ and $F_i^{max}$. For a current flow rate F, it is necessary, for each base, that:

$$u_i^{p,min} = \frac{F_i^{min}}{F} \leq u_i \leq u_i^{p,max} = \frac{F_i^{max}}{F}$$

scheduling constraints (inequalities): they correspond to the minimum and maximum incorporations of each base (the sum of the proportions of which is equal to 1). For the instantaneous mode, this results in minimum constraints $u_i^{0,min}$ and maximum constraints $u_i^{0,max}$.

incorporation variation constraints (inequalities): the proportion of each base i cannot change in proportion downwardly by more than $\delta u_i^b$ and upwardly by more than $\delta u_i^h$. Thus, if the proportion at the preceding feed is $u_i$, the current command must be greater than $u_i^{\delta,min} = u_i(1 - \delta u_i^b)$ and less than $u_i^{\delta,max} = u_i(1 - \delta u_i^h)$.

constant total output equality constraint (the sum of the proportions of the bases must be equal to 1);

(2) constraints on the properties of the mixture:
inequality constraints associated with the regulation equations expressing that the measured value y must meet its setpoint $y_{sp}$ (possibly able to be formulated in the form of inequality constraints by introducing tolerances—a formulation of the equality constraint type is required if there is no recourse to these tolerances);

inequality constraints for keeping the measured property values within a minimum/maximum range so as to meet the specifications and limit overspecification.

In this problem, the intended criterion may be expressed as a deviation with respect to the initial recipe that it is desired to minimize, while still ensuring that all the abovementioned constraints have been met.

When the problem P0 is not solvable (infeasibility of the mixing to take into account all the required specifications), an optimization sequence in three steps P1, P2 and P3 is initiated.

Problem P1: Management of the Hard Constraints

The problem P1 is implemented during step (b) of the optimization procedure described above.

A recipe u is thus determined for which the minimal regulation problem P1 is solved, which takes into account only constraints on the problem P0 that are defined as priority constraints. This problem P1 involves a succession of normally feasible optimization problems, the criteria of which consist in penalizing the violation of said priority constraints, so as to define achievable new values for these priority constraints.

These criteria correspond to inequality-type hierarchized priority constraints on the properties monitored, preferably hierarchized constraints of hard rank with priority with respect to the regulation objectives and incurring costs involved in not meeting the quality specifications.

This problem P1 relates to managing the hard constraints (constraints on the proportions of the bases and priority constraints on the properties of the mixture) in an iterative manner by decreasing priorities. Since several constraints may have the same priority, iterative management works by the set of constraints of equal priority.

Associated with each constraint is a rank. By convention, the lower the rank associated with the constraint, the lower the priority of the constraint. Positive ranks are associated with priority constraints, while negative ranks are associated with non-priority constraints.

Consider a partition of $H = H_m \cup H_M$ into p all-non-empty subsets $H_i$, each grouping together indices corresponding to outputs subject to hard constraints of equal priority. By construction, $p \leq \text{card}(H), U_{i=1}^p H_i = H$ and $H_i \cap H_j = \emptyset, \forall j \neq i$. The constraints relating to $H_j$ are of lower priority than those relating to $H_i$ whenever $i < j$. It should also be noted that $H_{1j} = U_{i=1}^j H_j$.

Iteration 1: treatment of the highest-priority constraints associated with $H_1$.

The following must be solved:

$$\min_{u,\varsigma} \|\hat{B}_{H_1} u + \varsigma - y_{H_1}^{max}\|^2$$

$$\begin{cases} u^{min} \leq u \leq u^{max} \\ \varsigma \geq 0 \\ \sum_{i=1}^n u_i = 1 \end{cases}$$

where $\zeta$ is a deviation variable vector (or slack vector) which makes it possible to increase the dimension of the optimization vector (u, $\zeta$) and to calculate an optimum deviation corresponding to the relaxation of constraints.

This problem has a solution when the initial value of u meets the limits and the equality constraint on the sum of its elements, which is always the case.

The solution (u*, $\zeta$*) allows the optimization problem to be relaxed, where appropriate.

By iterating over the card ($H_1$) elements $\zeta_j$ of $\zeta$, the achievable values $y_{H_1}^{max,att}$ are defined as follows:
if $\zeta_j > 0$, then the achievable value is the initial value of the constraint;
if $\zeta_j = 0$, then the achievable value is $\hat{B}_j u^*$.

Iteration k+1:

At the (k+1)th iteration, the following problem is solved:

$$\min_{u,\varsigma} \|\hat{B}_{H_{k+1}} u + \varsigma - y_{H_{k+1}}^{max}\|^2$$

$$\begin{cases} u^{min} \leq u \leq u^{max} \\ \varsigma \geq 0 \\ \sum_{i=1}^{n} u_i = 1 \\ \hat{B}_{H_{1k}} u \leq y_{H_{1k}}^{max, att} \end{cases}$$

This problem always has a solution since achievable values have been defined at the k preceding iterations for the constraints relating to the sets $H_1$ to $H_k$.

Like the preceding iterations, the solution (u*, ζ*) makes it possible to relax the optimization problem, where appropriate. By iterating over the card $(H_{k+1})$ elements $\zeta_j$ of $\zeta$, the achievable values $y_{H_{k+1}}^{max,att}$ are defined in the following manner:

if $\zeta_j > 0$, then the achievable value is the initial value of the constraint; and if $\zeta_j = 0$, then the achievable value is $\hat{B}_j u^*$.

The problem is entirely solved when the p subassemblies of constraints of decreasing priority have been addressed during the p iterations.

Thus, the sequence P1 is used, by successive optimizations, to solve the hard constraints (constraints on the proportions of the bases and positive-ranked constraints on the properties of the mixture). In the case of infeasibility, the constraints of lowest priority rank are relaxed. The ranks are used when it is not possible to meet all that is required. The hard constraints have a higher weight than the fixed-setpoint regulation objectives. The soft constraints of negative rank are ignored. The recipe optimization remains inactive in this sequence.

Problem P2: Management of the References

The problem P2 is involved during step (c) of the optimization procedure described above.

Thus, a recipe u is determined for which the regulation problem P2 is solved, which takes into account said achievable new values of the priority constraints of the problem P0 and also the non-priority constraints of the problem P0. This problem P2 involves an optimization problem, the criteria of which consist in penalizing the violation of said non-priority constraints so as to define achievable new values for these non-priority constraints.

These criteria correspond to equality constraints on the fixed-setpoint regulated priorities, preferably non-priority soft-rank constraints relative to the regulation objectives, but incurring an overquality.

This sequence comprises the set of hard constraints, with limits the value of which may have been relaxed during the sequence P1. The problem P2 seeks to satisfy as close as possible the regulation equations even if it entails, where appropriate, relaxing the setpoint within achievable setpoints. These equations are all dealt with simultaneously (this sequence P2 is not iterative).

An orientation of the relaxations is nevertheless possible by introducing, into the criterion, a weighting vector using relative weights characteristic of the relative importance of the properties, so as preferentially to relax the least important properties.

The soft constraints of negative rank are ignored and optimization of the recipe remains inactive.

The problem to be solved is:

$$\min_{u} \|\hat{B}_R u - y_R^{ref}\|^2$$

$$\begin{cases} u^{min} \leq u \leq u^{max} \\ \sum_{i=1}^{n} u_i = 1 \\ \hat{B}_H u \leq y_H^{max, att} \end{cases}$$

This problem always has a solution u* since all the hard constraints have been relaxed during solution of the problem P1. The achievable references are calculated as $y_R^{ref, att} = \hat{B}_R u^*$.

Problem P3: Management of the Soft Constraints

The problem P3 is involved during step (d) of the optimization procedure described above.

A recipe u is determined for which a regulation problem P3 is solved, which takes into account said new achievable values of the priority constraints of the problem P0 that are obtained in step (b), said new achievable values of the non-priority constraints obtained in step (c) and all the other non-priority constraints of the problem P0 that are not treated by problems P1 and P2. This problem P3 involves a succession of normally feasible optimization problems, the criteria of which consist in penalizing the violation of said other non-priority constraints so as to define achievable new values for these other non-priority constraints.

These criteria correspond to inquality-type hierarchized non-priority constraints on the properties monitored.

This problem relates to managing the soft constraints iteratively. This involves sequential management by packets of constraints of decreasing priority. In a manner similar to problem P1, the subsets $S_i$ of $S = S_m \cup S_M$ are introduced.

Iteration 1: Treatment of the Highest-Priority Constraints Associated with $S_1$.

The following have to be solved:

$$\min_{u,\varsigma} \|\hat{B}_{S_1} u + \varsigma - y_{S_1}^{max}\|^2$$

$$\begin{cases} u^{min} \leq u \leq u^{max} \\ \varsigma \geq 0 \\ \sum_{i=1}^{n} u_i = 1 \\ \hat{B}_H u \leq y_H^{max, att} \\ \hat{B}_R u = y_R^{Ref, att} \end{cases}$$

The solution (u*, ζ*) makes it possible to relax the optimization problem where appropriate. By iterating over the card $(S_1)$ elements $\zeta_j$ of $\zeta$, the achievable values $y_{S_1}^{max, att}$ are defined as follows:

if $\zeta_j > 0$, then the achievable value is the initial value of the constraint;

if $\zeta_j = 0$, then the achievable value is $\hat{B}_j u^*$.

Iteration k+1:

At the (k+1)th iteration, the following problem is solved:

$$\min_{u,\varsigma} \|\hat{B}_{S_{k+1}} u + \varsigma - y_{S_{k+1}}^{max}\|^2$$

$$\begin{cases} u^{min} \leq u \leq u^{max} \\ \varsigma \geq 0 \\ \sum_{i=1}^{n} u_i = 1 \\ \hat{B}_H u \leq y_H^{max,att} \\ \hat{B}_R u = y_R^{Ref,att} \\ \hat{B}_{S_{1k}} u \leq y_{S_{1k}}^{max,att} \end{cases}$$

Like the previous iterations, the solution ($u^*$, $\varsigma^*$) makes it possible to relax the optimization problem where appropriate. By iterating over the card ($S_{k+1}$) elements $\varsigma_j$ of $\varsigma$, the achievable values $y_{S_{k+1}}^{max,\,att}$ are defined in the following manner;

if $\varsigma_j > 0$, then the achievable value is the initial value of the constraint;

if $\varsigma_j = 0$, then the achievable value is $\hat{B}_j u^*$.

The problem is entirely solved when the subsets of decreasing-priority constraints have all been addressed.

This sequence P3 makes it possible to take into account, if possible, the soft constraints, depending on their rank, while satisfying the (optionally relaxed) regulation equations, with constraints on the proportions of the bases and optionally relaxed hard constraints on the properties of the mixture.

The constraints of identical rank are treated simultaneously in the optimization sequences. The recipe optimization remains inactive.

The overall solution of the optimization problem is completed after the last iteration of problem P3, the part $u^*$ of the solution of which is the calculated command to be applied to the mixer.

Preferably, for each problem, non-violation of the constraints on the proportions of the bases and non-violation of the constraint on the sum of the proportions of the bases, which must be equal to 1, are guaranteed. These constraints are therefore always taken into account.

Figure 3:
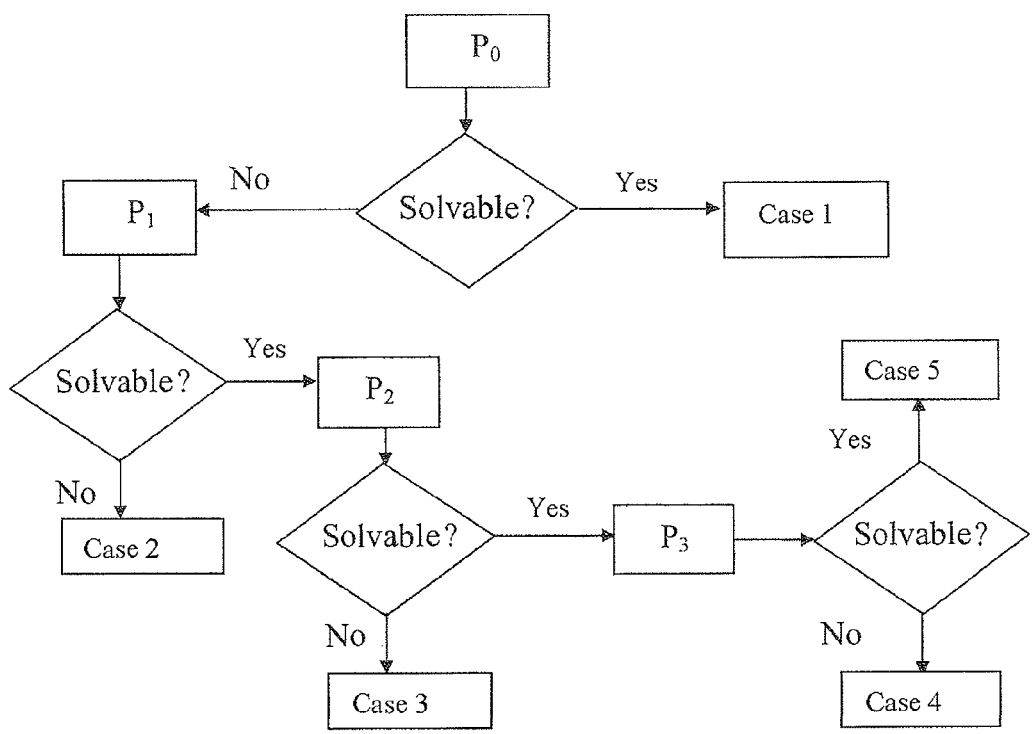
FIG. 3 shows an example of the sequencing of the optimization problems.

FIG. 3 shows the sequencing of the optimization problems P0 to P3 defined above.

If numerical resolution of the initial problem P0 has not provided a solution, the sequential resolution of problems P1, P2 and P3 is initiated. Although theoretically these problems always have a solution, their numerical resolution may fail. The recipe applied to the method depending on the resolution failures is the following (see FIG. 3)

Case 1: the recipe applied is the result of the initial optimization problem;

Case 2: the recipe applied is the actual recipe;

Case 3: the recipe applied is the result of the calculation of P1;

Case 4: the recipe applied is the result of the calculation of P2; and

Case 5: the recipe applied is the result of the calculation of P3.

When the numerical resolution of problems P1 to P3 fails and upon persistent relaxation of hard constraints when solving problem P1, monitoring of the outputs is activated. This monitoring consists in checking that:

the outputs $y_i$ associated with a setpoint $y^c_i$ remain within the range lying between $y_i^c - t^c$ and $y_i^c + t^c$, where $t^c$ is a tolerance defined by the user; and the outputs associated only with minimum limits $y^{min}$ and/or maximum limits $y^{max}$ do not exceed the values $y^{min} - t^{min}$ and/or $y^{max} + t^{max}$, where $t^{min}$ and $t^{max}$ are thresholds defined by the user.

If a threshold is exceeded, the command for the mixture is stopped.

It should be noted that the optimization problems are coded using the deviation e relative to the initial recipe $u^0$, and not directly in the variable u.

In contrast, the property estimator itself is coded using a coding in u and not in deviation e, thereby dispensing with the use of the initial mixing-onset measurements, which are often subject to inaccuracies.

In addition, the coding in the variable u according to the invention is perfectly compatible with the feedback procedure according to the invention described above.

It will be noted that a scaling of the equations involved in the optimization problems proposed gets round the problems of numerical conditioning, taking into account possibly different orders of magnitude of the properties in question.

This scaling consists in using a multiplicative scale factor applied to the right-hand and left-hand sides of the various constraints.

This factor is adjusted according to the property in question:

This scaling operation is performed using, as normalization value, an average of the extreme (minimum and maximum values) of the qualities of the constituents (when the property is not associated with a setpoint value).

Also used as normalization value is an average of the average of the extreme (minimum and maximum) values of the qualities of the constituents on the one hand and a possible setpoint value (when the property is associated with a setpoint value).

Furthermore, a normalization is also applied in the optimization criteria P1, P2, P3.

The norm used corresponds to a quadratic form defined by a diagonal matrix, the diagonal terms of which are inverse squares of the calculated scale factors.

Example 4

Optimization in Integrated Mode a. Constraints on the Properties of the Mixture

When the control mode is the instantaneous mode, the constraints defined on the properties of the mixture by the user are those used for the optimization, in particular, the objectives are setpoints supplied directly by the user.

In integrated control mode, the user may consider that what counts is management of the constraints not on the characteristics of the instantaneous mixture, but on the characteristics of the total volume that has flowed into the tank from the start of mixing in mixture-integrated mode and on the characteristics of the total volume of the tank in tank-integrated mode. This leaves latitude in the definition of the instantaneous constraints used for the optimization.

It is obviously possible to take the values defined by the user for the constraints associated with the total volume that has flowed, but these may be relaxed, as the following lines explain in detail.

If the current integrated value of the property of the mixture is denoted by $z^k$ and that at the $(k+1)^{th}$ iteration is denoted by $z^{k+1}$, for a current volume $V^k$, a current flow rate $F^k$ and an elapsed period T (or several periods likened to a sliding horizon), the current value $y^k$ of the property at the output of the mixer makes it possible to connect $z^k$ to $z^{k+1}$ whereby:

$$V^k z^k + F^k T y^k = (V^k + F^k T) z^{k+1}.$$

If the constraint supplied by the user is $z^{max}$ (the treatment described is similar in the case of the minimum constraints), at the current iteration, the following must apply:

$$y^k \leq \frac{(V^k + F^k T) z^{max} - V^k z^k}{F^k T}$$

The right-hand side of this inequality provides a maximum limit for $y^k$, which may be very different from $z^{max}$, but may however be used to avoid overconstraining the instantaneous command by choosing $y^{max} = z^{max}$. In contrast, it is undesirable to apply this limit when it is too different from $z^{max}$: a relaxation of $y^{max}$ larger than $z^{max}$+t is not allowed, $z^{max}$ being the constraint applied by the user and t being a tolerance also defined by the user.

b. Management of the References

In instantaneous mode, the regulated properties are the properties in the exit of the mixer. In this case, the references used during the optimization are equal to the setpoints defined by the user.

In tank-bottom-integrated mode, the regulated properties are the properties of the holding tank into which the mixture flows. The setpoints defined by the user relate to the properties of the tank. For the optimization, the references are calculated from these setpoints.

It is also possible to regulate some properties in instantaneous mode and others in integrated mode.

The case in which the mixture holding tank is empty at the start of mixing (or "mixture"-integrated mode, to distinguish from "tank-integrated mode").

Notations:

$y_j(t)$, the value of the property j at the exit of the mixer at time t;

$z_j(t)$, the value of the integrated property j of the flowed volume, corresponding here to the integrated property j of the mixture at time t;

V(t), the volume that has flowed since the start of mixing, corresponding here to the volume of the mixture at time t; and F(t), the total volume flow rate through the mixer at time t.

By simple mass balance:

$$\frac{dV(t)}{dt} = F(t) \text{ and } \frac{d(V(t)z_j(t))}{dt} = F(t)y_j(t).$$

For times $t_0$ and $t_1$, where $t_1 \geq t_0$, if $y_j$ and F are constant between $t_o$ and $t_1$, then:

$$V(t_1) = V(t_0) + F(t_0)(t_1 - t_0), \text{ and}$$

$$F(t_0)(t_1 - t_0) y_j(t_0) + V(t_o) = (V(t_o) + F(t_0)(t_1 - t_0)) z_j(t_1).$$

Defining a reference amounts to calculating the constant value $y_j^{ref}$ that the property at the exit of the mixer must take so that, at the end of time H (the sliding horizon chosen by the user) starting from the current time t, the integrated property $z_j$ passes from its current value $z_j(t)$ to its setpoint value $z_j^c$.

Thus, the following applies:

$$F(t)H y_j^{ref} + V(t) z_j(t) = (V(t) + F(t)H) z_j^c$$

that is, $$y_j^{ref} = z_j^c + \frac{V(t)}{F(t)H} (z_j^c - z_j(t)).$$

At each iteration, the reference is updated on the basis of this formula (sliding horizon).

The case in which the mixture holding tank is not empty at the start of mixing.

The calculation of the paths has to be modified.

If the initial volume is $V_0$ and the initial value of the property j in the tank is $z_{j0}$, then:

$$F(t) H y_j^{ref} + V(t) z_j(t) + V_0 z_{jo} = (V_0 + V(t) + F(t)H) z_j^c$$

where V(t) is the volume that has flowed since the start of mixing, corresponding here to the volume of the mixture at time t.

To avoid a jump in the reference, it is preferable to take into consideration, progressively, and not in a single go, the volume at the bottom of the tank.

To do this, a virtual setpoint $z_j^{cv}$ is defined, such that:

$$z_j^{cv} = z_j^c + a \frac{V_0}{V(t) + F(t)H} (z_j^c - z_{j0})$$

When a is equal to 0, there is no tank bottom.

When a is equal to 1, the entire tank bottom is taken into account. It therefore suffices to make a pass from 0 to 1 along a predetermined certain path in order to progressively take into account the tank bottom.

Example 5

Management of the Additives

The additives (or dopes), injected in small quantity, act essentially, but strongly, on one of the properties of the mixture. When there is no constraint on the additive flow rate, the doped property may be completely ignored in the optimization-sequence multivariable control problem. A single-variable regulator acting on the flow rate of the additive is then used to regulate this property. This is for example the additive injection controller 18 of the system described above. The operation of such a regulator is described below.

The following preliminary comments should be noted:

the effect on the property affected by the injection of a dope is considered to be instantaneous. However, for any property there exists a measurement delay, which may depend on the measured value. It will be assumed, which is the case in practice, that it is possible to link the measurement delay to the measured value;

the effect of a dope on a property is rather poorly quantified. It varies as a function of the current value of the doped property. It will be assumed that it is possible to link, even if somewhat imprecisely and for each value taken by the doped property, the variation of the dope flow rate to the variation of the value of the doped property.

The model used is expressed as:

$$\frac{dy}{dt} = K(y)\frac{dv}{dt},$$

where
- y is the measured value of the doped property
- v is the dope flow rate; and
- K is a gain that depends on the current value of the doped property. It will be assumed that there is a piecewise constant function of y for describing this gain.

From a discrete standpoint, at iteration k:

$$\Delta y^k = K(y^k)\Delta v^k.$$

In order for the output, the current value of which is $y^k$, to tend towards its reference value $y^{ref.r}$, it is sufficient that $\Delta v^k = (y^{ref.r} - y^k)/K(y^k)$. However, the value of the available output in k is not the current value, because of the measurement delay. The procedure must therefore be based on calculating the command on an estimate $\hat{y}^k$ of the output and to calculate the command by:

$$\Delta v^k = (y^{ref.r} - \hat{y}^k)/K(\hat{y}^k).$$

The estimate $\hat{y}^k$ is the sum of two terms:
- an open-loop estimate $K.\hat{x}^k$ (which uses $K(\hat{y}^k)$),
- a filtered bias $\bar{b}^k$, resulting from the first-order filtering of an instantaneous bias, synchronized deviation between measurement and open-loop prediction.

A measurement delay $\delta T$ corresponds to each measurement $y^k$, where T is the sampling period of the command. It will be assumed that a piecewise constant function of y describes this delay. The measurement $y^k$ thus corresponds to an open-loop prediction $\hat{x}^{k-\delta}$, which makes it possible to calculate the instantaneous bias $b^k = y^k - \hat{x}^{k-\delta}$. The filtering coefficient is set automatically according to the measurement delay.

For the command, the following constraints are managed:
- maximum variation of the injection by passing to the high level or to the low level;
- minimum and maximum injections.

In instantaneous value regulation, it is not possible to input a setpoint outside the extreme values set by the user.

In integrated value regulation, the reference path, which possibly includes taking into account the bottoms of the tanks, is calculated in a similar manner to those employed for the multivariable command. In particular, the instantaneous reference calculated from the setpoint cannot depart from the extreme values set by the user. In practice, this allows the set constraints on the regulated property to be met.

It is possible, when the dope flow rate is saturated (when the command remains equal to the minimum or to the maximum over a predetermined time), to switch to regulation of the doped property via the bases.

In this case, the doped flow rate remains equal to the value taken before the switch.

For a doped output, the cumulative effect due to the dope between time 0 at the start of mixing and the time t is given by:

$$d = \int_0^t K(\hat{y}(\tau))\frac{dv}{d\tau}(\tau)d\tau$$

i.e., from a discrete standpoint:

$$d^k = d^{k-1} + K(\hat{y}^k)\Delta v^k.$$

When switching to regulation of the property j via the bases, the control model takes this effect into account and is given by:

$$y_j = \hat{B}_j \mu + d.$$

This expression is used both in the successive optimizations and in the dynamic of $\hat{B}_j$ of the feedback system.

Example 6

Optimization of the Recipe

When degrees of freedom remain in the solution of the equations used in the optimization, it is possible to optimize the production of the mixture by modifying the recipe, that is to say the respective proportions of each base. Various options optimizing the recipe will be described in this example, for the optimization sequences described in example 3.

In the initial optimization problem P0 described in example 3, it is a question of minimizing the term $\|u - \bar{u}\|^2$.

The value of this reference recipe $\bar{u}$ in this expression depends on the optimization mode chosen by the user.

(a) In the Absence of Optimization $\bar{u}$ is simply equal to the initial value, that is to say the recipe supplied by the user for the start of mixing.

$\bar{u}$ may also be defined as a "follower" recipe, its value then being equal to the average value of u from the start of mixing.

(b) Optimization of the Incorporation of Certain Bases

It is possible to maximize or minimize the incorporation of certain bases, in excess or on the contrary scarcely available on the production site. In this case, a priority vector $\pi$ has to be associated with the recipe.

This vector includes positive inputs for the bases to be maximized and negative inputs for the bases to be minimized. The bases for which it is not desirable to maximize or minimize the incorporation have a zero priority.

Thus $\pi = (\pi_1, \ldots, \pi_n)_t$ and $|\pi_j| = \max_{i=1,n}|\pi_i|$, assumed to be non-zero.

Denoting the filtered value of u by $u^f$, we use $\bar{u} = u^f + \pi^{f}$, $\pi^{f}$ being the filtered value of:

$$\pi' = (\pi_1/|\pi_j|, \ldots, \pi_n/|\pi_j|)^t.$$

This $\pi'$ filter allows the recipe variations during mixing to be progressively taken into account.

(c) Optimization of the Cost of Mixing

A cost vector $\xi = (\xi_1, \ldots, \xi_n)^t$ is associated with u. A cost of the recipe, based on the filtered recipe $u^f$: $c = \xi^t u^f$, is defined for each pass.

Next, (c: non-zero) a vector $\xi'$ is defined by:

$$\xi' = ((1-\xi_1/c), \ldots, (1-\xi_n/c))^t.$$

Thus $\xi'_i$, defined by $\xi'_i = (1-\xi_i/c)$, is positive if the cost of the base is below the cost of the current filtered recipe: in this case, it is necessary to seek to incorporate this base in order to limit the cost of the recipe. Conversely, $\xi'_i$ is negative if the cost of the base is greater than the cost of the recipe.

For the optimization, $\bar{u} = u^f + \xi'$.

(d) Saturation of the Specifications on the Outputs

In this case, $\bar{u}$ is equal to the initial recipe, but in fact it has only little importance. This is because if the initial problem P0 has a solution, then the iterative problem described below is initiated.

Let $M = \{1, 2, \ldots, m\}$ be the set of indices assigned to the outputs and let P be the subset of the indices indicating the outputs involved in the optimization procedure.

Associated with each element j of P are:
an element of H, in other words:
either a maximum value not to be exceeded,
or a minimum value not to be gone below;
a threshold $d_j$ relative to the constraint.

Consider a partition of P into p all-non-empty subsets $P_i$ each grouping together indices corresponding to outputs subject to equal-priority optimization requirements. By construction, $p \leq card(P)$, $\cup_{i=1}^{p} P_i = P$ and $P_i \cap P_j = \emptyset$, $\forall j \neq i$.

The optimizations relating to $P_j$ have a lower priority than those relating to $P_i$ whenever i<j. Also note that $P_{1j} = \cup_{i=1}^{j} H_j$.

Iteration 1

At the first iteration, the aim is to approach the outputs corresponding to $P_1$ to their constraints:

$$\min_u \left\| \hat{B}_{P_1} u - y_{P_1}^{max} + d_{P_1} \right\|^2$$

$$\begin{cases} u^{min} \leq u \leq u^{max} \\ \sum_{i=1}^{n} u_i = 1 \\ \hat{B}_R u = y_R^{ref} \\ \hat{B}_H u \leq y_H^{max} \\ \hat{B}_S u \leq y_S^{max} \end{cases}$$

The solution u* is used to calculate $y_{P_1}^{min} = \hat{B}_{P_1} u^*$.

Iteration k+1

At the (k+1)th iteration, the following problem is solved:

$$\min_u \left\| \hat{B}_{P_{k+1}} u - y_{P_{k+1}}^{max} + d_{P_{k+1}} \right\|^2$$

$$\begin{cases} u^{min} \leq u \leq u^{max} \\ \sum_{i=1}^{n} u_i = 1 \\ \hat{B}_R u = y_R^{ref} \\ \hat{B}_H u \leq y_H^{max} \\ \hat{B}_S u \leq y_S^{max} \\ \hat{B}_{P_{1k}} u \geq y_{P_{1k}}^{min} \end{cases}$$

The problem is entirely solved when the p subassemblies of constraints of decreasing priority have been addressed during p iterations. The outputs are then as close as possible to their constraints.

Example 7

Continuous Hydrodesulphurization Mixer Control

Example 7 shows the regulation of the instantaneous sulphur content value for a mixture produced from several bases.

It may be noted here that this sulphur regulation is accompanied in parallel with the in-zone regulation and monitoring of other properties of the mixture, within a multivariable control context.

This example illustrates the capability of the system to ensure continuous instantaneous control, in order to act on the composition for charging a gasoil hydrodesulphurization unit so as to control the properties of the mixture output by the unit.

It also illustrates the capability of the system to manage complex mixer upstream schemes with several constituent premixing operations.

The following elements are taken into account:
analyser delays: 5 minutes in the case of density, sulphur content (estimator reset on the corresponding analyser) and the calculated percentage distilled; 10 minutes in the case of the flash point; and 15 minutes in the case of the cloud point;

unit transit dead volumes: 96 $m^3$;

premixing dead volumes: 16.8 $m^3$ and 10.9 $m^3$ in the first premixing stage; 4.5 $m^3$ in the second premixing stage; and 10.8 $m^3$ and 1.4 $m^3$ in the third premixing stage.

The charge constituents are the following:

Base 1: kerosene;

Base 2: low-sulphur-content kerosene;

Base 3: light gasoil with a low and high sulphur content, coming from an atmospheric distillation;

Base 4: medium gasoil coming from atmospheric and vacuum distillations;

Base 5: FCC LLCO olefinic base, coming from an intermediate tank; and

Base 6: FCC heavy petrol fraction.

Other bases can be used for charging the unit: FCC LLCO, HLCO and HCCS direct streams, VGO direct visbreaking gasoil stream (direct unit stream), recycle from the unit.

The characteristics of the bases 1 to 5 measured in the laboratory are given in Table 2 below:

TABLE 2

Characteristics of the bases of example 7

|  | Base 1 | Base 2 | Base 3 | Base 4 | Base 5 |
|---|---|---|---|---|---|
| Density (at 15° C.) | 0.7995 | 0.8279 | 0.8558 | 0.883 | 0.835 |
| Flash point (° C.) | 42.5 | 66 | 77 | 52.5 | 50 |
| Cloud point (° C.) | −48.09 | −19.9 | 8.401 | −29.96 | −30.97 |
| Cetane number | 45.97 | 54.8 | 57.77 | 25.3 | 23.5 |
| Percentage distilled at 360° C. (%) | 100 | 100 | 89.8 | 100 | 100 |
| Sulphur content (ppm) | −19.39 | 54.9 | 99.71 | 40.08 | 30.03 |

The minimum thresholds are soft thresholds for all the properties except for the flash point and the cetane number.

The maximum thresholds are hard thresholds for all the properties except for the cetane number, the flash point and the percentage distilled.

The values of these maximum and minimum thresholds used for the various properties are the following:

TABLE 3

Values of the maximum and minimum thresholds of the properties of the mixture of example 7

| Property: | Maximum threshold | Minimum threshold |
|---|---|---|
| Density | 0.844 | 0.82 |
| Flash point (° C.) | 65 | 57 |
| Cloud point (° C.) | −6 | −15 |
| Cetane number | 53 | 46.5 |
| Percentage distilled (%) | 100 | 95 |
| Sulphur content (ppm) | 48 | 30 |

The reference path horizons used are defined as being equal to twice the analyser delay, increased by parameterizable values called reduced horizons. The reduced horizons used are the following: 10 minutes in the case of the density, the cetane number, the sulphur content and the percentage distilled; 20 minutes for the flash point; and 30 minutes for the cloud point.

The filtering coefficients used for adjusting the estimator are the following; 15 minutes for the density, the cetane number, the percentage distilled and the sulphur content; 30 minutes for the flash point; and 45 minutes for the cloud point. These filtering coefficients (the inverses of the 13, appearing in formulae (1) and (2) defined above) correspond to the component parameters of the vector $\beta$ that are used in the differential equations of the estimator, making it possible for the relatively rapid rate of convergence to be controlled, property by property.

Recipe optimization objectives are also used to maximize the use of base 1 (kerosene) and base 4 (medium distillation gasoil).

At the start of mixing, the minimum and maximum values of the sulphur content are 30 and 48 ppm respectively. The thresholds are then modified, passing to 2 and 8 ppm respectively. The sulphur is "in zone" regulated within its minimum and maximum limits. It is this transition from the [30, 48] threshold to the [2, 8] threshold that allows switching from the 50 ppm step (the aim here is to have a sulphur content close to 48 ppm in order to have a manufacturing margin of 2 ppm) to the 10 ppm step (the aim here is to have a sulphur content close to 8 ppm, so as to have a manufacturing margin of 2 ppm).

The mixture topology is specified in Table 4.

TABLE 4

Topology of the mixture of example 7

| Base 1 (75) | Mixture A = | | Final mixture = |
|---|---|---|---|
| Base 2 (121) | bases 1 + 2 | | A + C + Base 6 |
| Base 3 (79) | Mixture B = | Mixture C = | |
| Base 4 (74) | bases 3 + 4 | B + base 5 | |
| Base 5 (63) | | | |
| Base 6 (8) | | | |

Figure 4:
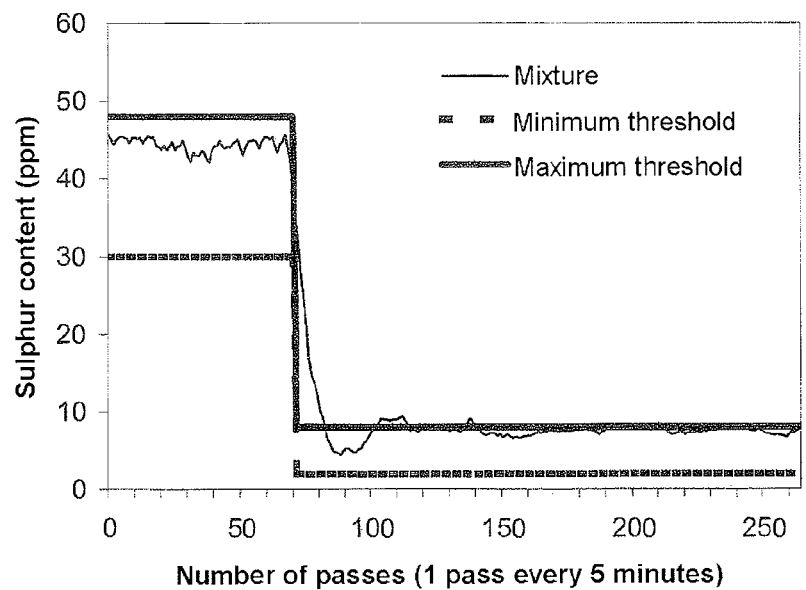
FIG. 4 shows the variation of the sulphur content of the mixture of example 7 as a function of time.

FIG. 4 shows the variation in the sulphur content of the mixture during a rapid transition from the 50 ppm step to the 10 ppm step as a function of the number of passes, each pass corresponding to 5 minutes. Each pass corresponds to a new implementation of the system according to the invention (and therefore to a new iteration of the control method according to the invention) and especially to the transmission of a new recipe calculated by the system and applied to the equipment.

This setpoint transition is in fact provided by modifying the minimum and maximum thresholds, knowing that the sulphur regulation is carried out here in zone, that is to say between its minimum and its maximum. This sulphur content quality therefore does not have a fixed setpoint-type target, but it is the high-limit and low-limit constraints on this sulphur content quality which here are taken into account by the optimizer and which define a target range of variation for this quality.

It will be noted that the sulphur content of the mixture at any moment remains close to the desired value, and rapidly follows the setpoint reduction command, without undergoing large sudden changes in value.

The estimator according to the invention makes it possible not only to ensure regulation of the sulphur content on leaving the unit but also the in-zone regulation of the density, the flash point, the cloud point, the cetane number and the percentage distilled (the flash point is in minimum constraint, while the sulphur content and the cloud point are in maximum constraint).

Figure 5:
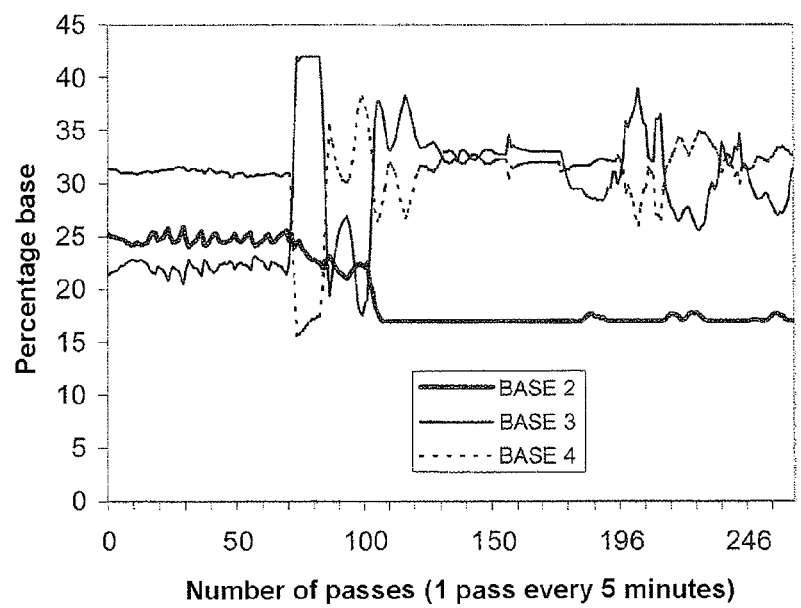
FIG. 5 shows the variation of the proportions of the bases of the mixture of example 7 as a function of time.

FIG. 5 shows the variation in consumption of the bases 2 to 4 used during modification of the sulphur content command, the bases 1, 5 and 6 not being injected for producing the mixture. The calculated constituent proportion profiles shown in the figure make it possible to obtain the desired results with respect to the properties on leaving the unit.

Example 8

Petrol Mixture in Tank-Bottom-Integrated Mode (without Premixing)

Figure 6A:
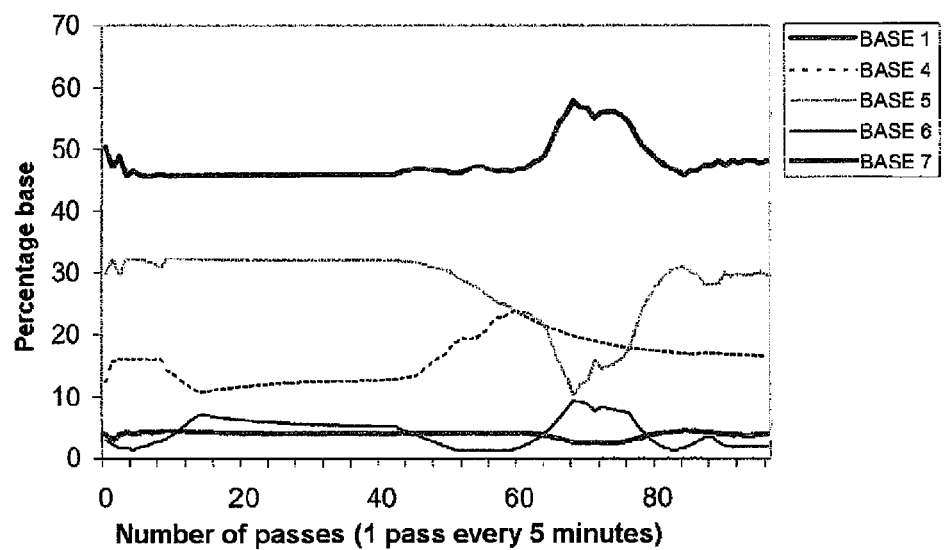

FIGS. 6*a-e* show the variation in time of the ratio of the bases (FIG. 6*a*), regulations on the RON (research octane number) and on the RVP (Reid vapour pressure) (FIGS. 6*b* and 6*c* respectively) and the in-zone monitoring of the percentage distilled at 100° C. (FIG. 6*d*) and the benzene content (FIG. 6*e*).

Figure 6B:
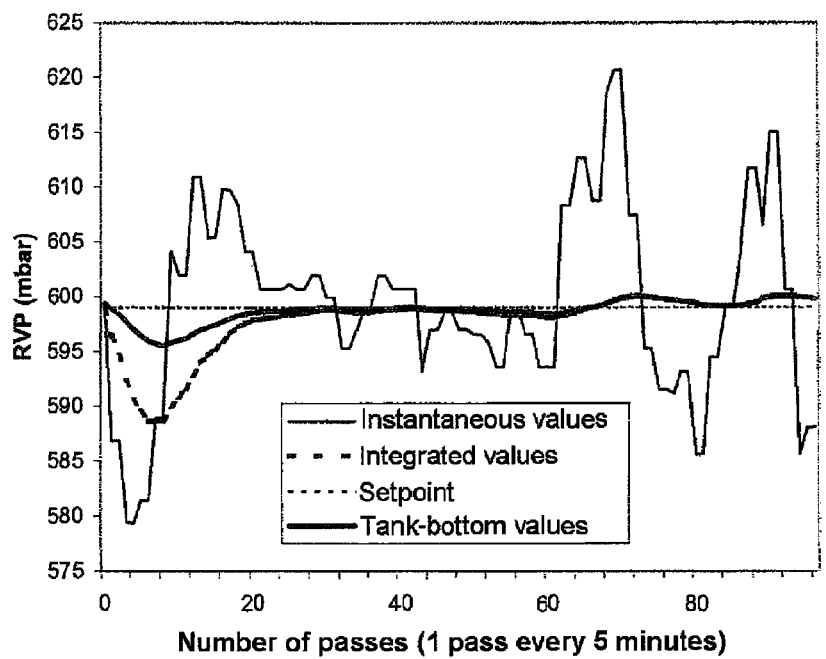
Figure 6C:
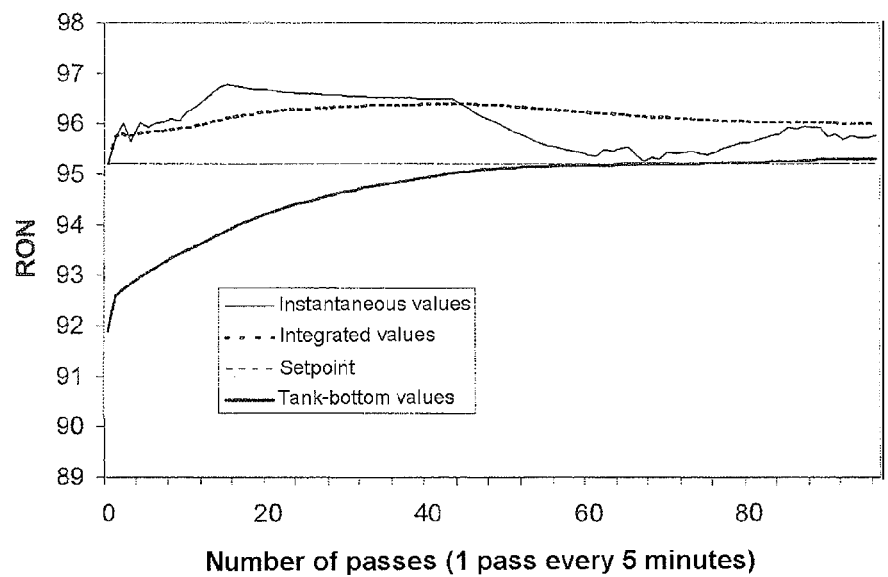
Figure 6D:
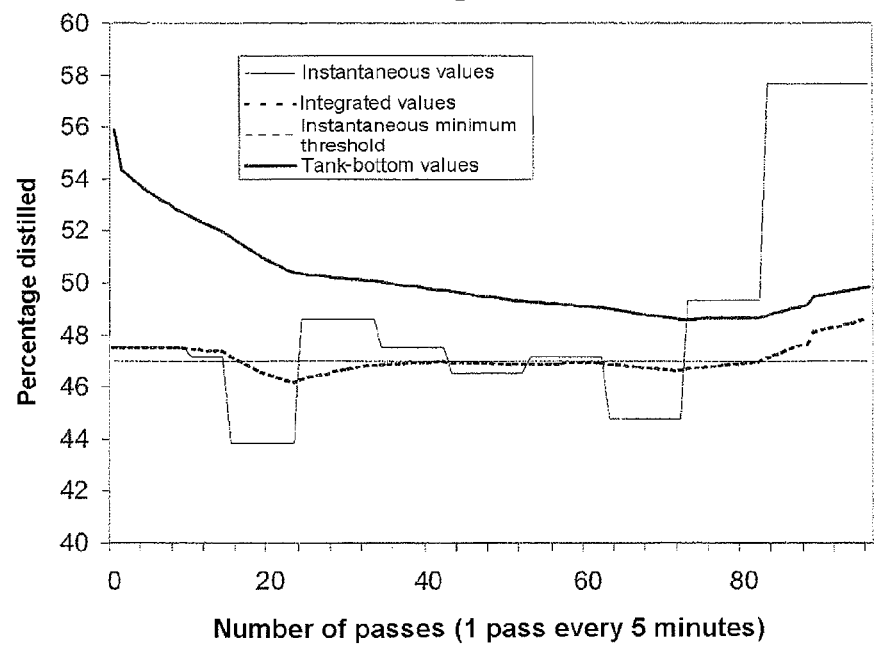

The tank-integrated values, the instantaneous values and the setpoints are shown in FIGS. 6*a* to 6*c*.

The values relating to the benzene content, to the percentage distilled at 100° C., to the MON (motor octane number), to the RON (research octane number) and to the RVP (Reid vapour pressure) are given in the following table for the various constituent bases:

TABLE 5

Property values of the bases of example 8

| | Base 1 | Base 4 | Base 5 | Base 6 | Base 7 |
|---|---|---|---|---|---|
| Benzene content (%) | 1.050 | 0 | 1.130 | 0 | 0 |
| Percentage distilled at 100° C. (%) | 64.9 | 29.6 | 6.9 | 100.0 | 125.0 |
| MON | 80.0 | 93.0 | 91.5 | 101.0 | 86.0 |
| RON | 89.90 | 95.10 | 102.40 | 113.00 | 96.00 |
| RVP (mbar) | 565.89 | 454.00 | 186.37 | 551.90 | 4000.59 |

This example demonstrates the operation of the regulation with tank-bottom compensation. Two qualities, namely the vapour pressure and the octane number, converge while two other qualities, namely the percentage distilled at 100° C. and the benzene content, are maintained within their admissible range.

The minimum and maximum values of the regulated and monitored qualities are provided in [min/max] form and are the following:

Benzene content (%): [0/0.95];
Percentage distilled at 100° C. (%): [47/70];
RON: [95.199/96.50] with the minimum value 95.199 as setpoint; and
RVP (mbar): [459.99/599.86], with a setpoint of 598.86.

It may be seen at around pass 70 in the second half of the mixing that there is increased activity on the bases because, since the quality of the percentage distilled at 100° C. has reached its low (minimum) limit, the recipe is automatically modified in order to raise its value and keep it above its minimum threshold, while still maintaining the other regulated and monitored properties at their target values.

This example illustrates the capability of the system to control the mixing in integrated mode with tank-bottom compensation by making it possible to control both fixed-setpoint-regulated qualities and monitored qualities in their minimum/maximum zone.

Example 9

Gasoil Mixture, Regulation of Dopes (without Premixing)

FIG. 7

This example demonstrates the operation of the regulation by injecting additives or dopes.

Two properties: cetane number and filterability here are regulated by dopes. A third property (sulphur content) is regulated in parallel by mixing two bases, a third base being blocked on a fixed ratio.

The following table provides the values relating to the sulphur content, the filterability and the cetane number of the three bases.

TABLE 6

| Properties of the bases of example 9 | | | |
|---|---|---|---|
| | Base 1 | Base 3 | Blocked base |
| Sulphur content (ppm) | 30 | 246 | 3 |
| Filterability (° C.) | 0 | −30 | −12 |
| Cetane number | 52 | 52 | −1e+6 |

The base called "blocked base" is injected with a constant ratio of 1.5%.

The sulphur content is regulated on a 45 ppm setpoint, the filterability on a −16° C. setpoint and the cetane number on a 52 setpoint.

Figure 7D:
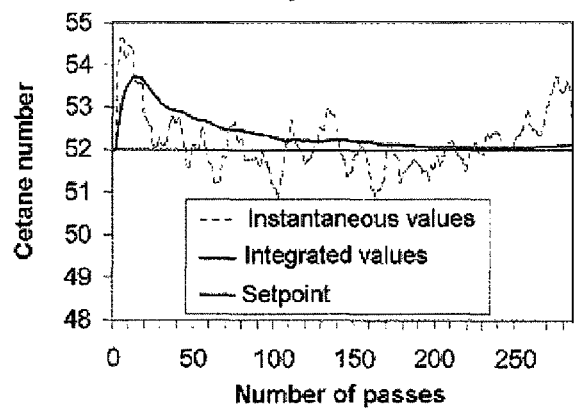

As indicated in FIGS. 7a-f:

FIG. 7a shows that the injection of pro-cetane additive is lowered until this injection is cut off in the middle of mixing, in order to lower the integrated cetane number (FIG. 7d), which gently joins its setpoint and is maintained thereat.

Figure 7E:
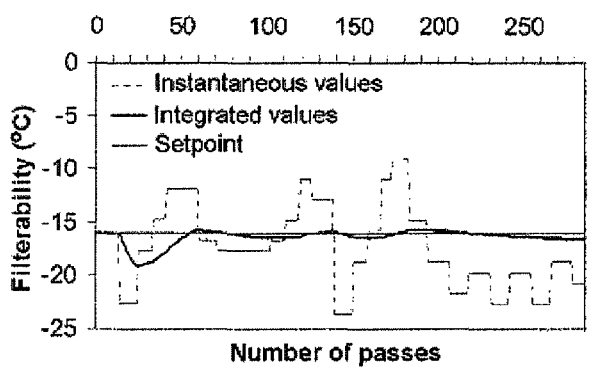

FIG. 7b shows the filterability dope injections, with three peaks corresponding to the small oscillations in the integrated filterability, seen in FIG. 7e. This denotes a reactively adjusted regulation.

FIG. 7c gives the profiles of the bases used for regulating the sulphur content. These profiles are quite steady, apart from a peak in the middle of mixing as a result of the peak observed in the instantaneous sulphur measurement in FIG. 7f, due to a discrete perturbation.

Figure 7F:
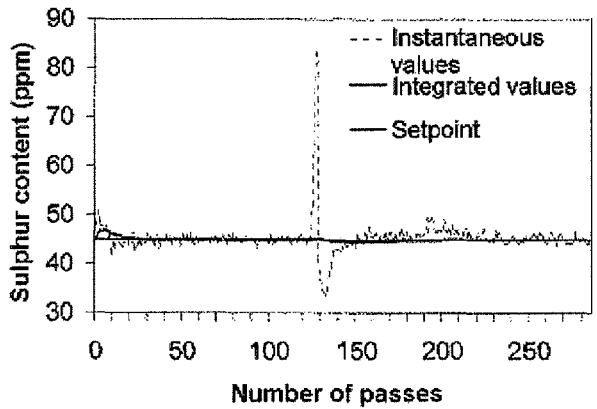

The integrated sulphur content is coincident with its setpoint in FIG. 7f and has not been affected by the discrete perturbation in the middle of mixing.

This example illustrates the capability of the system to provide simultaneous mixture-integrated control, by controlling the mixture constituents and by injecting several additives in order to control various properties of the mixture.

The invention claimed is:

1. Method for controlling the production of a mixture M of n constituents, comprising:
   at time t=0 a step (i) of estimating a reference recipe $\bar{u}$ on the basis of the properties of the n constituents assembled in a matrix $\hat{B}$ having an initial value B0 corresponding to the following equation (1)

$$\frac{d\hat{B}_j^t}{dt} = -\beta_j Hu(y_j - y_j^{mes}) \quad (1)$$

in which
   $\beta_j$, a strictly positive real number, is a constant for setting a convergence time, allowing a rate of convergence of an estimate to be differentiated property by property;
   H is a positive definite symmetric matrix having the purpose of ensuring normalization in taking into account measurement-prediction deviation, allowing constituent quality prediction deviation calculation, so as to provide method convergence properties; and
   $\hat{B}_j^t$ is the transpose of $\hat{B}_j$, where j is a mixture property index,
and such that properties $\hat{B}\bar{u}$ mixture lie between predetermined minimum and maximum thresholds and/or for at least some of them are equal to predetermined target values, and the application of said equation to a real mixture of the constituents,
   at a time t'=t+Δt, Δt being the period of transition between two consecutive calculation iterations, a step (ii) of correcting the matrix $\hat{B}$ on the basis of measured properties $y^{mes}$ of mixture M manufactured, in order to calculate a new recipe u corresponding to the corrected matrix $\hat{B}$ of estimated properties of the constituents of the mixture, followed by the application of this new recipe u to the constituents for manufacturing the mixture M, this step (ii) comprising the following operations:
      (1) obtaining properties $y^{mes}$ of the mixture M by applying the recipe calculated at the previous time are measured,
      (2) a corrected matrix $\hat{B}$, representing the estimate of the properties of the constituents, is deduced therefrom,
      (3) a new recipe u is determined in such a way that properties $\hat{B}u$ of the mixture lie between said predetermined thresholds and/or, for m' of them, are equal to said predetermined target values,
      (4) this new recipe u is applied to the constituents, at time t"=t'+Δt a step (iii) identical to step (ii), this step (ii) being repeated identically throughout the duration of production of mixtures of the constituents,
   the method being characterized in that the matrix $\hat{B}$ of step (ii) is corrected by at least one additional correction operation introducing at least one constraint corresponding to limit, order relationship and/or equality constraints.

2. Method according to claim 1, characterized in that, to correct the matrix $\hat{B}$, $B_0$, is modified by replacing equation (1) with an equation corresponding to a new adaptation law and/or by adding an additional term δ.

3. Method according to claim 1, characterized in that the matrix $\hat{B}$ is modified by replacing the initial equation (1) with an equation comprising the addition of an additional function to equation (1), namely:

$$\frac{d\hat{B}_j^t}{dt} = -\beta_j Hu(y_j - y_j^{mes}) + \lambda f(\hat{B}_y^t) \quad (1.1)$$

in which
   f is a non-zero function chosen according to a profile for introducing at least one constraint corresponding to limit, order relationship and/or equality constraints;

λ is a weighting coefficient which allows the speed of return of the estimated properties of the constituents into a permissible field defined by limits to be adjusted; and H is a diagonal matrix, so as to ensure the convergence properties of the method.

4. Method according to claim 3, characterized in that the matrix $\hat{B}$ is modified by adding an additional term δ to equation (1.1) and corresponds to the following calculation:

$$\hat{B}\text{complete}_j{}^t = (\hat{B}_j{}^t + \delta) \tag{1.4}$$

in which the vector δ satisfies the equation δ*u=0, so that the predictions are unchanged by virtue of the equation:

$$y = \hat{B}_j{}^{t*}u = (\hat{B}_j{}^t + \delta)^*u \tag{1.5}.$$

5. Control method according to claim 3, characterized in that, when there is at least one premixing operation involving at least two of the constituents before production of the mixture, the variable u determined during operation (3) of step (ii) is modified in order to take into account delays due to dead volumes present in a plant in premixing zones, and by correcting the matrix $\hat{B}$ during step (ii), the variable u used for implementing an adaptation law according to equation (1.1) is replaced with a variable U where $U(t)=(U_1(t), \ldots U_n(t))^t$, at time t, a recipe vector taking into account dead volume.

6. Method according to claim 1, characterized in that the matrix $\hat{B}$ is modified by replacing the initial equation (1) with an equation corresponding to an adaptation law according to the following equation:

$$\frac{d\hat{B}_j^t}{dt} = -\beta_j H \frac{1}{\delta t} \int_{t-\delta t}^{t} u(\hat{B}_j u - y_j^{mes}) ds \tag{1.2}$$

where δt is the integration time window and s is the time variable under the integral.

7. Method according to claim 6, characterized in that the matrix $\hat{B}$ is modified by adding an additional term δ to equation (1.2) and corresponds to the following calculation:

$$\hat{B}\text{complete}_j{}^t = (\hat{B}_j{}^t + \delta) \tag{1.4}$$

in which the vector δ satisfies the equation δ*u=0, so that the predictions are unchanged by virtue of the equation:

$$y = \hat{B}_j{}^{t*}u = (\hat{B}_j{}^t + \delta)^*u \tag{1.5}.$$

8. Control method according to claim 6, characterized in that, when there is at least one premixing operation involving at least two of the constituents before production of the mixture, the variable u determined during operation (3) of step (ii) is modified in order to take into account delays due to dead volumes present in a plant in premixing zones, and by correcting the matrix $\hat{B}$ during step (ii), the variable u used for implementing an adaptation law according to equation (1.2) is replaced with a variable U where $U(t)=(U_1(t), \ldots U_n(t))^t$, at time t, a recipe vector taking into account dead volume.

9. Method according to claim 1, characterized in that the matrix $\hat{B}$ is modified by replacing the initial equation (1) with an equation corresponding to an adaptation law according to the following equation:

$$\frac{d\hat{B}_j^t}{dt} = -\frac{\beta_j}{\delta t} H \int_{t-\Delta-\frac{\delta t}{2}}^{t-\Delta+\frac{\delta t}{2}} u(s)(\hat{B}_j u(s) - y_j^{mes}) ds \tag{1.3}$$

in which δt is the integration time window and Δ is the measurement delay and s is the time variable under the integral.

10. Method according to claim 9, characterized in that the matrix $\hat{B}$ is modified by adding an additional term δ to equation (1.3) and corresponds to the following calculation:

$$\hat{B}\text{complete}_j{}^t = (\hat{B}_j{}^t + \delta) \tag{1.4}$$

in which the vector δ satisfies the equation δ*u=0, so that the predictions are unchanged by virtue of the equation:

$$y = \hat{B}_j{}^{t*}u = (\hat{B}_j{}^t + \delta)^*u \tag{1.5}.$$

11. Control method according to claim 9, characterized in that, when there is at least one premixing operation involving at least two of the constituents before production of the mixture, the variable u determined during operation (3) of step (ii) is modified in order to take into account delays due to dead volumes present in a plant in premixing zones, and by correcting the matrix $\hat{B}$ during step (ii), the variable u used for implementing an adaptation law according to equation (1.1) is replaced with a variable U where $U(t)=(U_1(t), \ldots U_n(t))^t$, at time t, a recipe vector taking into account dead volume.

12. Method according to claim 1, characterized in that the matrix $\hat{B}$ is modified by adding an additional term δ to equation (1) and corresponds to the following calculation:

$$\hat{B}\text{complete}_j{}^t = (\hat{B}_j{}^t + \delta) \tag{1.4}$$

in which the vector δ satisfies the equation δ*u=0, so that the predictions are unchanged (iso-prediction) by virtue of the equation:

$$y = \hat{B}_j{}^{t*}u = (\hat{B}_j{}^t + \delta)^*u \tag{1.5}.$$

13. Method according to claim 12, characterized in that the vector δ is defined either by a direct algebraic calculation or by constrained sequential optimization.

14. Method according to claim 1, in which the properties $y^{mes}$ of the mixture, measured during step (ii), are measured by means of a continuous measurement process on the mixture produced.

15. Control method according to claim 1, characterized in that, when there is at least one premixing operation involving at least two of the constituents before production of the mixture, the variable u determined during operation (3) of step (ii) is modified in order to take into account delays due to dead volumes present in a plant in premixing zones.

16. Control method according to claim 15, characterized in that, by correcting the matrix $\hat{B}$ during step (ii), the variable u used for implementing an adaptation law according to equation (1.0) is replaced with a variable U where $U(t)=(U_1(t), \ldots U_n(t))^t$, at time t, a recipe vector taking into account dead volume.

17. Control method according to claim 1, characterized in that the recipe u determined at the end of step (ii) is obtained by means of an optimization process comprising sequential steps during which the solution of a minimum problem respecting a minimum of priority constraints is sought if a complete problem respecting all of the constraints is unfeasible, the number of priority constraints to be respected increasing at each step, until a recipe u respecting a maximum number of priority constraints is obtained.

18. Control method according to claim 1, intended for a plant for producing a mixture of n constituents and of additives, characterized in that, for a property j of the mixture on which an additive has an influence, a control model takes into account an effect d of additive addition during operations (2) and (3) of step (ii) according to:

$$y_j = \hat{B}_j u + d.$$

19. System for producing and controlling a mixture of constituents, comprising transport channels for transporting the constituents to be mixed into a main channel connected to a place for receiving a mixture, means for controlling flow rates of the constituents in each transport channel, means for continuously measuring, in the main channel, representative parameters of a mixture being produced, and means for calculating the proportions of various constituents involved in the mixture, an estimator connected to the means for calculating, the estimator comprising programmed means for producing an estimate of the properties of the constituents using measurements of the properties of the mixture that are measured by the means for measuring, the means for calculating comprising programmed means for calculating, by means of this estimate, the proportions of the various constituents involved in the mixture so as to obtain a mixture having predetermined properties, this system being characterized in that the estimator comprises programmed means for introducing at least one constraint corresponding to limit, order relationship and/or equality constraints on at least one of the properties for correcting matrix $\hat{B}$ of step (ii) of the method according to claim 1.

20. System according to claim 19, characterized in that the estimator includes programmed synchronization means for taking into account delays due to dead volumes in zones for premixing, said synchronization means being programmed to implement equation (2)

$$\frac{d\hat{B}_j^t}{dt} = -\beta_j H U(t)(y_j(t) - y_j^{mes}(t))$$

with $U(t)=(U_1(t), \ldots, U_n(t))^t$, in operation (3) of step (ii) of said method.

21. System according to claim 19, characterized in that it includes an optimizer connected to the means for calculating and to a mixture-objectives storage means, the optimizer including programmed means for optimizing the recipe u of the proportions of the constituents and said recipe being determined by the calculation means as a function of mixture objectives stored in said storage means.

22. System according to claim 21, characterized in that it includes at least one additive tank connected via a transport channel to the main channel, downstream of a zone for mixing the constituents, a means for controlling flow rate associated with the tank provided in the transport channel, and an additive injection controller connected to said control means, to the optimizer and to the mixture-objectives storage means, the additive injection controller being capable, for a property j of the mixture on which an additive has an influence, of optimizing the proportion of the additive so as to regulate said corresponding property j of the mixture, taking into account a target supplied by the mixture-objectives storage means.

* * * * *